(12) United States Patent
Borzov

(10) Patent No.: US 11,303,617 B2
(45) Date of Patent: Apr. 12, 2022

(54) METHODS AND APPARATUSES FOR OBLIVIOUS TRANSFER USING TRUSTED ENVIRONMENT

(71) Applicant: Dmitry Borzov, Waterloo (CA)

(72) Inventor: Dmitry Borzov, Waterloo (CA)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 52 days.

(21) Appl. No.: 16/816,120

(22) Filed: Mar. 11, 2020

(65) Prior Publication Data
US 2021/0288946 A1     Sep. 16, 2021

(51) Int. Cl.
*H04L 29/06*     (2006.01)
*H04L 9/32*      (2006.01)
*H04L 9/06*      (2006.01)

(52) U.S. Cl.
CPC ......... *H04L 63/0457* (2013.01); *H04L 9/065* (2013.01); *H04L 9/3213* (2013.01); *H04L 63/123* (2013.01)

(58) Field of Classification Search
CPC ... H04L 63/0457; H04L 63/123; H04L 9/065; H04L 9/3213; H04L 63/102; H04L 63/0428; G06F 21/6218; G06F 17/30949; G06F 17/30091; G06F 17/30109
See application file for complete search history.

(56) References Cited

U.S. PATENT DOCUMENTS

| | | | |
|---|---|---|---|
| 3,198,786 A | 8/1965 | Tilles et al. | |
| 9,317,218 B1* | 4/2016 | Botelho | G06F 16/1748 |
| 10,216,754 B1* | 2/2019 | Douglis | G06F 16/1744 |
| 10,228,924 B2* | 3/2019 | Berger | G06F 9/45533 |
| 2005/0086509 A1* | 4/2005 | Ranganathan | G06F 21/57 726/27 |
| 2007/0237151 A1* | 10/2007 | Alfano | H04L 47/34 370/392 |
| 2014/0149553 A1* | 5/2014 | Bank | H04L 65/602 709/219 |
| 2015/0100527 A1* | 4/2015 | Ryan | G06N 5/048 706/20 |

(Continued)

FOREIGN PATENT DOCUMENTS

WO     2019123346 A1     6/2019

OTHER PUBLICATIONS

Nitesh Mor, "Edge Computing", ACM Queue, vol. 16, Issue 6, 2019.

(Continued)

*Primary Examiner* — Abu S Sholeman

(57) ABSTRACT

Methods and apparatuses for performing oblivious transfer using a trusted intermediate environment are described. A data object identifier is used to identify requested data object. The requested data object is stored as a plurality of corresponding data chunks over a plurality of data buckets. The data object identifier is encoded with information identifying each of the plurality of corresponding data chunks within each respective data bucket. A trusted intermediate environment receives a data stream that includes data chunks stored in an assigned data bucket. Using the encoded information from the data object identifier, the trusted intermediate environment determines which of the data chunks in the data stream is the corresponding data chunk streamed from the assigned data bucket.

14 Claims, 14 Drawing Sheets

(56) References Cited

U.S. PATENT DOCUMENTS

| | | | |
|---|---|---|---|
| 2016/0014110 A1* | 1/2016 | Kurspahic | H04L 9/085 |
| | | | 713/183 |
| 2016/0283731 A1* | 9/2016 | Chow | G06F 21/57 |
| 2017/0147602 A1* | 5/2017 | Darcy | H04L 63/10 |
| 2018/0018228 A1 | 1/2018 | Johnson | |
| 2019/0318107 A1* | 10/2019 | Capone | G06F 16/152 |
| 2020/0311039 A1* | 10/2020 | Gupta | G06F 16/148 |

OTHER PUBLICATIONS

C. Aguilar-Melchor et al; "XPIR : Private Information Retrieval for Everyone", 2015.

C. McAnlis et al.; "Understanding Compression: Data Compression for Modern Developers", 2016.

S.W.Smith, D.Safford; "Practical server privacy with secure Coprocessors", IBM Systems Journal, vol. 40, No. 3, 2001.

Z. Galil, J.Seiferas; "Time-space optimal string Matching", 13th Annual ACM STOC (1981), pp. 106-103, 1981.

Y. Yoo, Young Gap Kwon, A. Ortega; "Embedded image-domain compression using context Models", Proceedings 1999 International Conference on Image Processing, 199.

* cited by examiner

METHODS AND APPARATUSES FOR OBLIVIOUS TRANSFER USING TRUSTED ENVIRONMENT

FIELD

The present disclosure is related to methods and apparatuses for secure transmission of electronic data, such as oblivious transfer of data, which may include the use of a trusted environment, such as a trusted execution environment.

BACKGROUND

Content that is distributed over a network (such as the internet) can be served from a third-party server, which is operated and controlled by neither the publisher of the data, nor the intended recipient, such as the consumer. For example, a data object (DO) containing a video can be distributed to on-demand video internet resource customers with the help of a content delivery network (CDN) service or a cloud hosting provider.

As the third-party server serves the actual content requests, the server's operator is able to see what specific DOs the recipients are requesting, which means that such a distribution does not guarantee data consumption privacy for the recipients. Encrypting data before the distribution will not amend this problem in cases where the pool of the recipients is open to public, such as, for example, an on-demand video internet resource.

The problem of achieving data privacy from the server operator, in a more general form, is referred to as oblivious transfer (OT) or private information retrieval (PIR) in the academic literature.

One family of the solutions to the OT problem is to add a trusted environment, such as a trusted execution environment (TEE) hardware, to the third-party server. Some computation operations that are performed in the TEE are protected from the server's operator. The user of TEE may thus enable obfuscating what specific DO was requested within each specific content request from the server's operator. However, such an approach has the problem that the total size of the distributed DOs is typically much larger than the available memory within the TEE, which hinders practical implementation. It would be desirable to provide a way to improve the use of the TEE for secure and private distribution of DOs.

SUMMARY

In various examples described herein, methods and apparatuses are provided that help to preserve data privacy for content delivery from a third-party server. A trusted environment, such as a TEE, is used. The disclosed examples may enable practical implementation because the computational and memory costs are relatively lower than other approaches.

In some aspects, the present disclosure describes a method, in a trusted environment within a server. The method includes: receiving, into the trusted environment, a data object identifier identifying a requested data object, the requested data object being stored as a plurality of corresponding data chunks in a respective plurality of data buckets, the data object identifier being encoded with information identifying each of the plurality of corresponding data chunks within the respective data bucket; wherein an assigned data bucket has been assigned to the trusted environment, and wherein a data stream corresponding to the assigned data bucket is received into the trusted environment, the data stream including all data chunks stored in the assigned data bucket; determining, using the encoded information, which of the data chunks in the data stream is the corresponding data chunk streamed from the assigned data bucket; and sending the corresponding data chunk out of the trusted environment to the server.

In some examples, the method further includes receiving the data stream from the server into the trusted environment.

In some examples, the encoded information identifying the plurality of corresponding data chunks maybe a plurality of fingerprint values, and each fingerprint value may uniquely identify a respective corresponding data chunk within a respective data bucket.

In some examples, determining the corresponding data chunk may include: determining a correct fingerprint value from the data object identifier, the correct fingerprint value identifying the corresponding data chunk for the assigned data bucket; determining the fingerprint value for each of the data chunks in the data stream; and comparing the fingerprint value for each of the data chunks in the data stream with the correct fingerprint value, to determine the corresponding data chunk.

In some examples, the data object identifier may be further encoded with information for ordering the corresponding data chunks to recover the requested data object.

In some examples, determining which of the data chunks is the corresponding data chunk may include using the information for ordering the corresponding data chunks to determine the information identifying the corresponding data chunk for the assigned data bucket.

In some examples, the encoded information for ordering the corresponding data chunks may be a permutation token.

In some examples, the method may further include: receiving, into the trusted environment, the data object identifier as an encrypted data object identifier; decrypting the data object identifier using a private key of the trusted environment; and sending the corresponding data chunk out of the trusted environment to the server as an encrypted corresponding data chunk.

In some examples, the method may further include: performing the steps of receiving the data object identifier, determining the corresponding data chunk, and sending the corresponding data chunk, at least partly in parallel for a first and a second received data object identifier.

In some examples, the data stream may include compressed data, and the method may further include decompressing the compressed data.

In some aspects, the present disclosure describes a method, in a publisher server. The method includes: for each given data object of a plurality of data objects: dividing the given data object into a plurality of corresponding data chunks; and assigning each of the plurality of corresponding data chunks to a respective one of a plurality of data buckets based on similarity of each corresponding data chunks to any other data chunk assigned to the respective data bucket; wherein all data chunks for all data objects are assigned to one of the plurality of data buckets; for each given data object, generating a data object identifier for recovering the given data object from the plurality of data buckets, the data object identifier being encoded with information identifying each of the plurality of corresponding data chunks within a respective data bucket, the data object identifier further being encoded with information for ordering the corresponding data chunks to recover the requested data object; compressing each data bucket into a respective set of compressed data; and publishing the sets of compressed data and the generated data object identifiers.

In some examples, the data chunks assigned to each respective data bucket may be ordered according to similarity within each respective data bucket.

In some examples, generating the data object identifier may include: for each given data bucket, determining a fingerprint value for each data chunk assigned to the given data bucket, the fingerprint value uniquely identifying each respective data chunk within the given data bucket; and for each given data object, encoding in the data object identifier the fingerprint value for each respective corresponding data chunk.

In some examples, generating the data object identifier may include: for each given data object: determining a bucket order by which each corresponding data chunk has been assigned to a respective data bucket; generating a permutation token representing the bucket order; and encoding in the data object identifier the permutation token.

In some examples, each data bucket may have assigned thereto a single corresponding data chunk from each data object.

In some examples, each data bucket may be compressed using an adaptive statistical encoding compressing.

In some aspects, the present disclosure describes a method, at an electronic device. The method includes: receiving a plurality of data chunks in response to a query for a data object; determining, from a data object identifier associated with the data object, information for ordering the data chunks to recover the data object; and reordering the data chunks to recover the data object.

In some examples, the method further includes: transmitting the query for the data object, the query including the data object identifier.

In some examples, the data object identifier transmitted in the query may be encoded with information identifying each of the plurality of data chunks within a respective data bucket, and the data object identifier may be further encoded with the information for ordering the data chunks.

In some examples, determining the information for ordering the data chunks may include a permutation token encoded in the data object identifier.

In some examples, the method may further include: receiving the plurality of data chunks as a plurality of encrypted data chunks; and decrypting the plurality of encrypted data chunks using a private key.

BRIEF DESCRIPTION OF THE DRAWINGS

Reference will now be made, by way of example, to the accompanying drawings which show example embodiments of the present application, and in which.

Similar reference numerals may have been used in different figures to denote similar components.

DESCRIPTION OF EXAMPLE EMBODIMENTS

In examples disclosed herein, methods and apparatuses are described that help to enable content delivery from a server and achieve data privacy from the operator of the server, using a trusted secure intermediate environment. The disclosed approach may be implemented using considerably lower computational and memory costs per served request, which may enable economically viable commercialization of such a solution. To assist in understanding the present disclosure, FIGS. 1-3 are first discussed.

Figure 1:
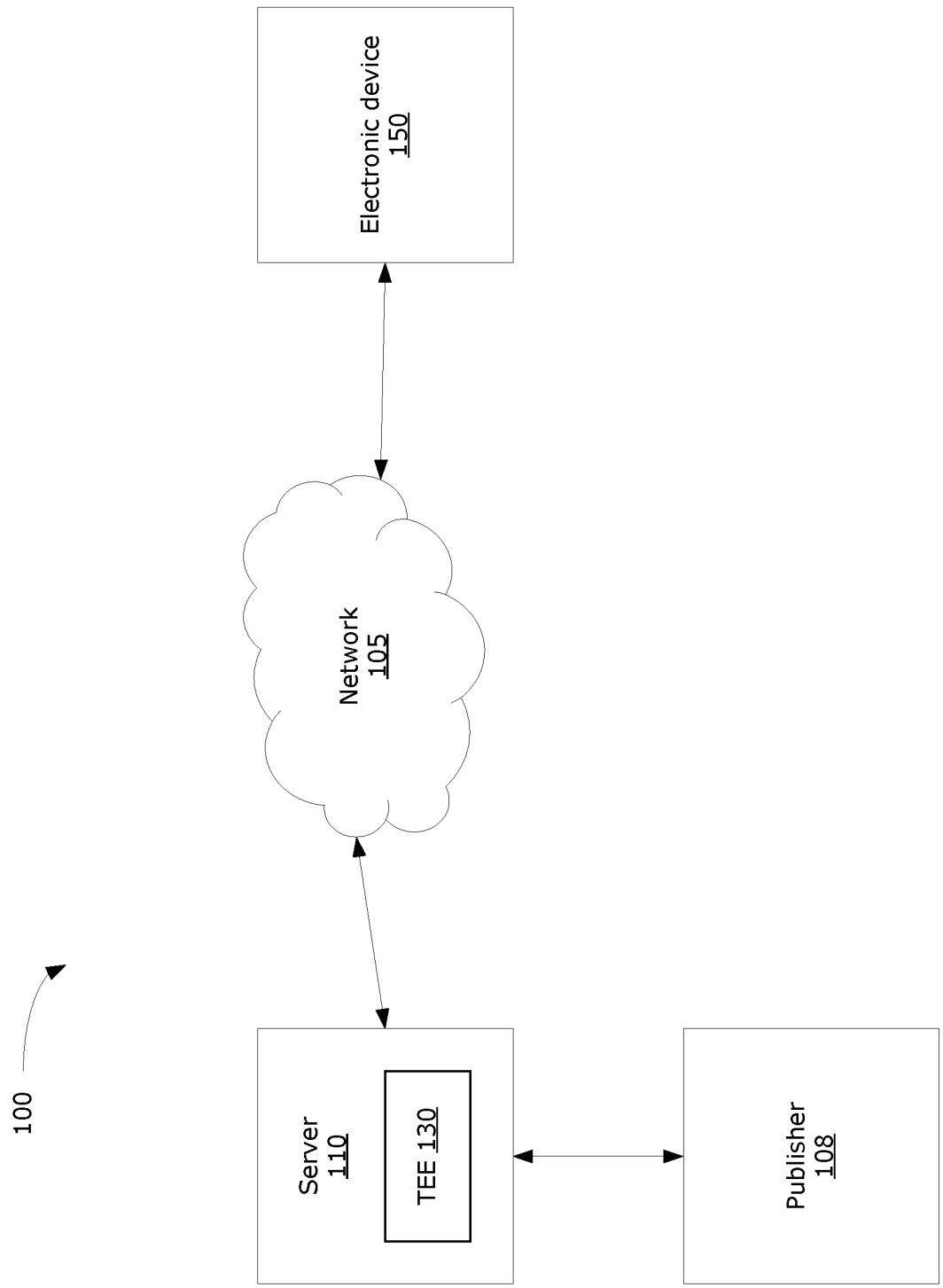
FIG. 1 is a block diagram illustrating an example simplified system in which examples disclosed herein may be implemented.

FIG. 1 illustrates an example system 100 including a network 105. The system 100 has been simplified in this example for ease of understanding; generally, there may be more entities and components in the system 100 than that shown in FIG. 1. The network 105 may be any form of network (e.g., an intranet, the Internet, a P2P network, a WAN and/or a LAN) and may be a public network. The system 100 may be used for distribution of content, published by a publisher 108 and stored on a third-party datacenter, in this example a server 110. The publisher 108 may be a publisher server, which will be referred to herein as a publisher 108. The content is distributed from the server 110 to an electronic device (ED) 150, via wireless communications over the network 105. Although not shown in FIG. 1, communications between the publisher 108 and the server 110 may also be over the network 105 or another network (which may be private or public), or may be over wired connections. A trusted, secure environment, such as a trusted execution environment (TEE) 130, exists within the server 110, as discussed further below. Although FIG. 1 illustrates a single TEE 130 within the server 110, it should be understood that there may be a plurality of TEEs 130 in the server.

Figure 2:
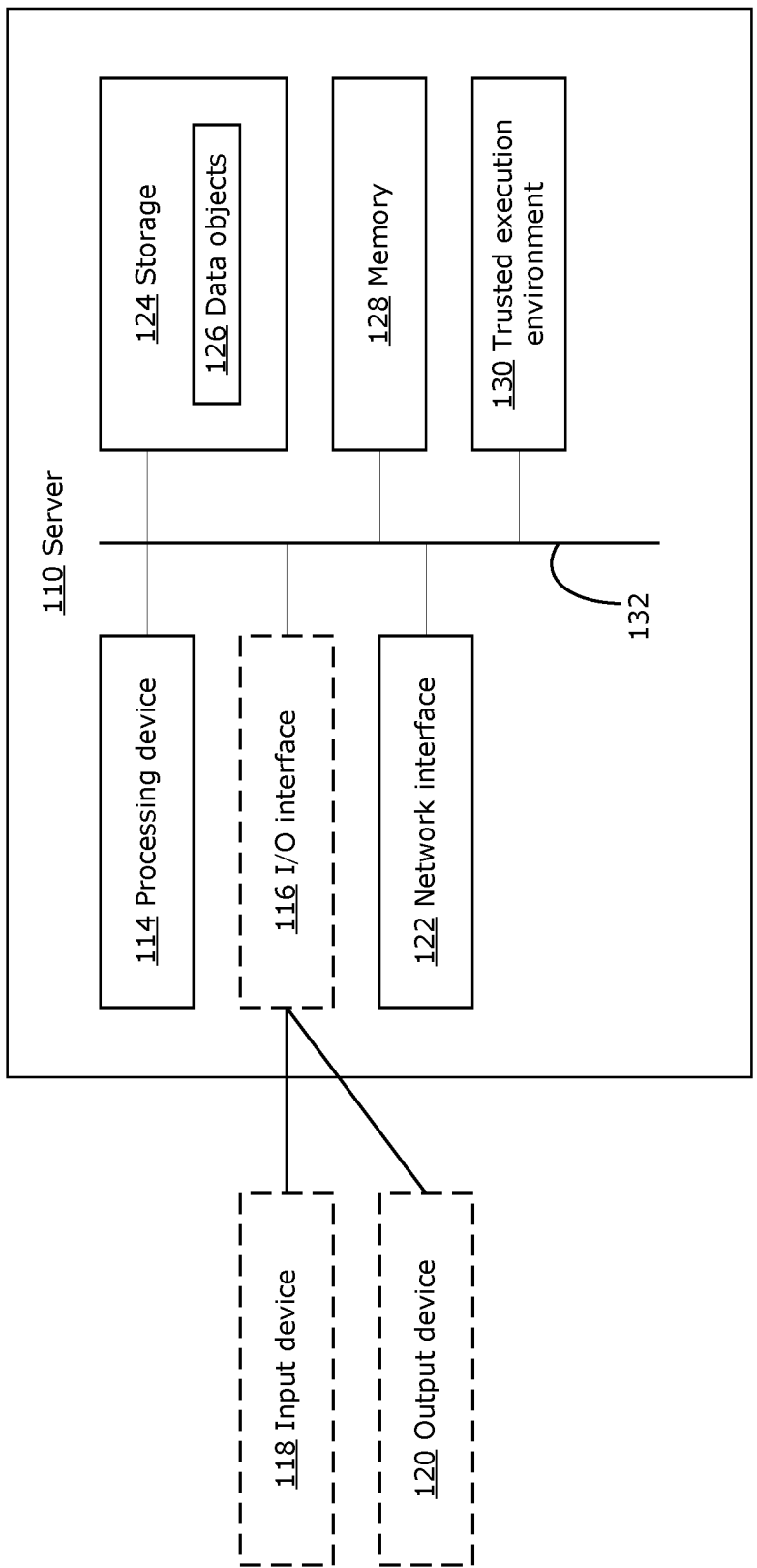
FIG. 2 is a block diagram of an example server that may be used to implement examples described herein.
Figure 3:
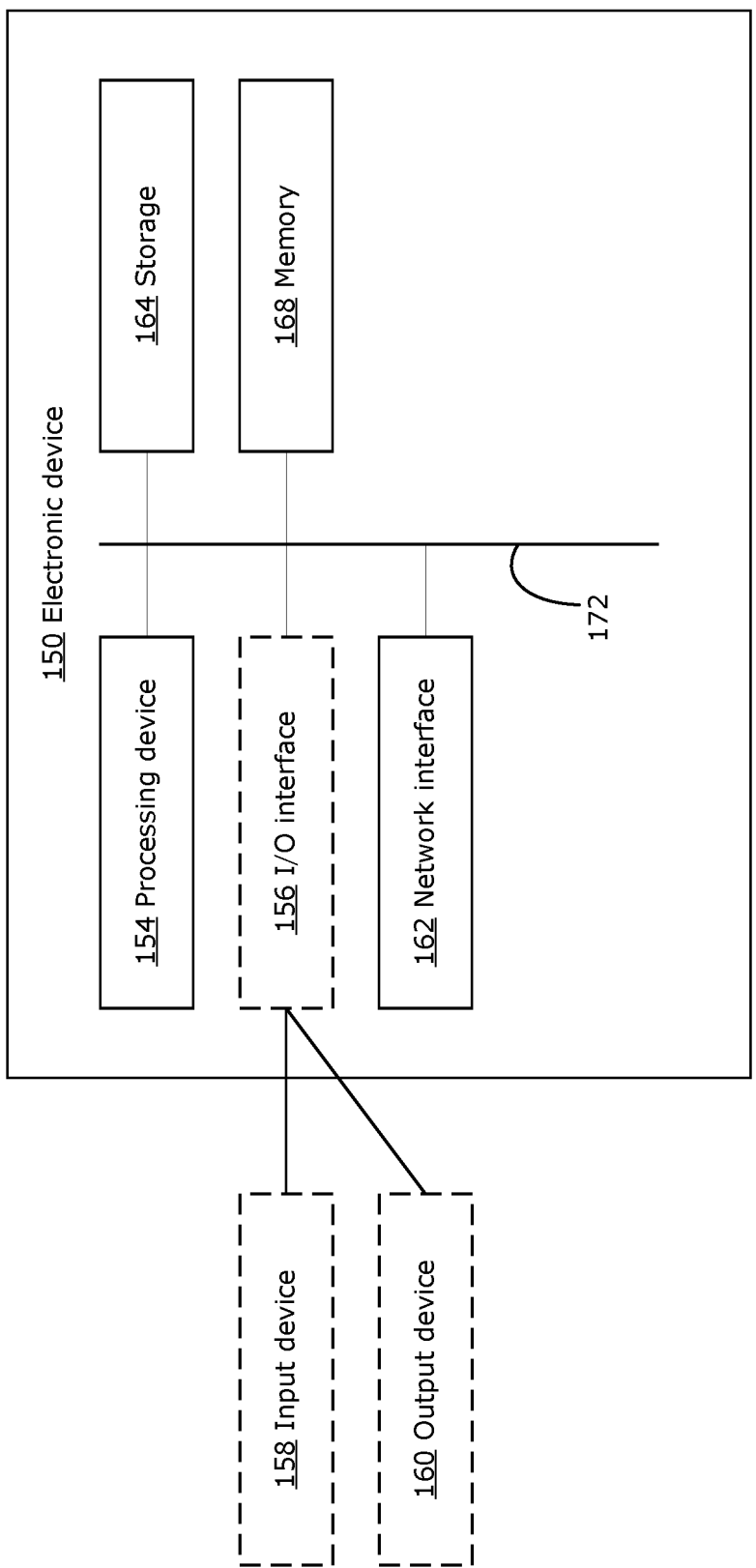
FIG. 3 is a block diagram of an example electronic device that may be used to implement examples described herein.

FIG. 2 is a block diagram illustrating a simplified example of the server 110. Other examples suitable for implementing embodiments described in the present disclosure may be used, which may include components different from those discussed below. Although FIG. 2 shows a single instance of each component, there may be multiple instances of each component in the server 110.

The server 110 may include one or more processing devices 114, such as a processor, a microprocessor, a digital signal processor, an application-specific integrated circuit (ASIC), a field-programmable gate array (FPGA), a dedicated logic circuitry, a dedicated artificial intelligence processor unit, or combinations thereof. The server 110 may also include one or more optional input/output (I/O) interfaces 116, which may enable interfacing with one or more optional input devices 118 and/or optional output devices 120.

In the example shown, the input device(s) 118 (e.g., a keyboard, a mouse, a microphone, a touchscreen, and/or a keypad) and output device(s) 120 (e.g., a display, a speaker and/or a printer) are shown as optional and external to the server 110. In other examples, there may not be any input device(s) 118 and output device(s) 120, in which case the I/O interface(s) 116 may not be needed.

The server 110 may include one or more network interfaces 122 for wired or wireless communication with the network 105, the ED 150, or other entity or node in the system 100. The network interface(s) 122 may include wired links (e.g., Ethernet cable) and/or wireless links (e.g., one or more antennas) for intra-network and/or inter-network communications.

The server 110 may also include one or more storage units 124, which may include a mass storage unit such as a solid state drive, a hard disk drive, a magnetic disk drive and/or an optical disk drive. The storage unit(s) 124 may store one or more data objects (DOs) 126 that may be requested by and transmitted to the ED 150, as discussed further below. DOs 126 may include content having a large amount of data, for example video files. DOs 126 stored by the third-party server 110 may be published by a publisher other than the operator of the server 110. The DOs 126 may be encrypted and the contents of the DOs 126 may be unknown to the operation of the server 110. The DOs 126 may be stored in a compressed form, as discussed further below.

The server 110 may include one or more memories 128, which may include a volatile or non-volatile memory (e.g., a flash memory, a random access memory (RAM), and/or a read-only memory (ROM)). The non-transitory memory(ies) 128 may store instructions for execution by the processing device(s) 114, such as to carry out examples described in the present disclosure. The memory(ies) 128 may include other software instructions, such as for implementing an operating system and other applications/functions. In some examples, the memory(ies) 128 may include software instructions for execution by the processing device 114 to retrieve and transmit DO(s) 126 in response to a request from the ED 150, as discussed further below. In some examples, the server 110 may additionally or alternatively execute instructions from an external memory (e.g., an external drive in wired or wireless communication with the server 110) or may be provided executable instructions by a transitory or non-transitory computer-readable medium. Examples of non-transitory computer readable media include a RAM, a ROM, an erasable programmable ROM (EPROM), an electrically erasable programmable ROM (EEPROM), a flash memory, a CD-ROM, or other portable memory storage.

The server 110 also includes a trusted, secure environment, for example a TEE 130, in which operations can be performed that are obfuscated or hidden from the operator of the server 110. Although the TEE 130 is shown as an example of a hardware-enabled trusted environment within the server 110, the trusted environment may be implemented in other ways. The trusted environment, whether implemented using the TEE 130 or in other ways, protects the privacy and security of data and operations performed within the trusted environment. The trusted environment has security features (typically physical security features) that provide tampering resistance, which protects the integrity of stored data, encryption keys and instructions executed in the trusted environment. The trusted environment provides a secure intermediate environment that is trusted by the ED 150 for private and secure data transfer from the server 110. In some examples, the trusted environment may be any secure environment that mediates data transfer from the server 110 to the ED 150, and may include a trusted environment that is provided by hardware external to the server 110. For example, the trusted environment may be within the ED 150 or within a third network entity, among other possibilities. For simplicity, the present disclosure will refer to the TEE 130; however, it should be understood that the trusted environment may be implemented in other ways. For example, the trusted environment may also be implemented using a hardware security module (HSM) or trusted platform module (TPM), among other possibilities.

It should be noted that although the TEE 130 is within the server 110, because the TEE 130 is protected from the operator of the server 110, the TEE 130 may be discussed and represented herein as a component separate from the overall server 110, even though the TEE 130 may physically be implemented within the server 110. In the example where the TEE 130 is within the server 110, signals and data may be communicated between the TEE 130 and the overall server 110 (i.e., the server environment external to the TEE 130). Thus, the TEE 130 may be considered to receive and transmit electronic signals and data from and to the server 110 despite being physically part of the server 110 in some examples. For example, such communications between the server 110 and the TEE 130 within the server 110 may involve internal communications between physical chips of the server 110, among other possible implementations.

The server 110 may also include a bus 132 providing communication among components of the server 110, including those components discussed above. The bus 132 may be any suitable bus architecture including, for example, a memory bus, a peripheral bus or a video bus.

FIG. 3 is a block diagram illustrating a simplified example of the ED 150. Other examples suitable for implementing embodiments described in the present disclosure may be used, which may include components different from those discussed below. Although FIG. 3 shows a single instance of each component, there may be multiple instances of each component in the ED 150.

The ED 150 may be any suitable end user device for wireless operation and may include such devices (or may be referred to) as a user equipment/device (UE), wireless transmit/receive unit (WTRU), mobile station, fixed or mobile subscriber unit, cellular telephone, station (STA), personal digital assistant (PDA), smartphone, laptop, computer, tablet, wireless sensor, smart device, or consumer electronics device, among other possibilities.

As shown in FIG. 3, the ED 150 includes at least one processing device 154. The processing device 154 implements various processing operations of the ED 150. For example, the processing device 154 could perform signal coding, data processing, power control, input/output processing, or any other functionality enabling the ED 150 to operate in the system 100. The processing device 154 may also be configured to implement some or all of the functionality and/or embodiments described herein. The processing device 154 may be, for example, a processor, a microprocessor, a digital signal processor, an application-specific integrated circuit (ASIC), a field-programmable gate array (FPGA), a dedicated logic circuitry, a dedicated artificial intelligence processor unit, or combinations thereof.

The ED 150 may also include one or more optional input/output (I/O) interfaces 156, which may enable interfacing with one or more optional input devices 158 and/or optional output devices 160. The input/output device(s) 158, 160 permit interaction with a user, for example. Each input/output device 158, 160 includes any suitable structure for providing information to or receiving information from a user, such as a speaker, microphone, keypad, keyboard, display, or touchscreen, among other possibilities. In some examples, a single device may provide both input and output capabilities, such as a touchscreen.

The ED 150 also includes one or more network interfaces 162 to enable communications in the system 100. The network interface(s) 162 include any suitable structure for generating signals for wireless or wired transmission and/or processing signals received wirelessly or by wire. The network interface(s) 162 may include wired links (e.g., Ethernet cable) and/or wireless links (e.g., one or more antennas) for intra-network and/or inter-network communications. In some examples, the network interface(s) 162 may include separate transmitter and receiver components; in other samples, the network interface(s) 162 may include a transceiver component that combines the functions of a transmitter and a receiver.

The ED 150 may also include one or more storage units 164, which may include a mass storage unit such as a solid state drive, a hard disk drive, a magnetic disk drive and/or an optical disk drive. The ED 150 may also include one or more memories 168, which may include a volatile or non-volatile memory (e.g., a flash memory, a random access memory (RAM), and/or a read-only memory (ROM)). The non-transitory memory(ies) 168 may store instructions for execution by the processing device(s) 154, such as to carry out examples described in the present disclosure. The memory(ies) 168 may include other software instructions, such as for implementing an operating system and other applications/functions. In some examples, the memory(ies) 168 may include software instructions for execution by the processing device 154 to request and recover (e.g., decrypt) DO(s) 126 from the server 110, as discussed further below.

In some examples, the ED 150 may additionally or alternatively execute instructions from an external memory (e.g., an external drive in wired or wireless communication with the server 150) or may be provided executable instructions by a transitory or non-transitory computer-readable medium. Examples of non-transitory computer readable media include a RAM, a ROM, an erasable programmable ROM (EPROM), an electrically erasable programmable ROM (EEPROM), a flash memory, a CD-ROM, or other portable memory storage.

As mentioned previously, the problem of achieving data privacy from the operator of the server 110, when content is requested by the ED 150, may be known in the art as oblivious transfer (OT). With the use of OT, the ED 150 may request a specific DO within a dataset stored by the server 110, and may receive a correct response to the request in such a way so that the operator of the server 110 has no knowledge of which of the DOs within the dataset was requested and transmitted.

Solutions to the OT problem have been proposed, for example by Smith et al. (S. W. Smith, D. Safford; "Practical server privacy with secure coprocessors", *IBM SYSTEMS JOURNAL*, Vol 40, No. 3, 2001). To help understand the drawbacks of existing solutions, a simple example is described below.

Figure 4:
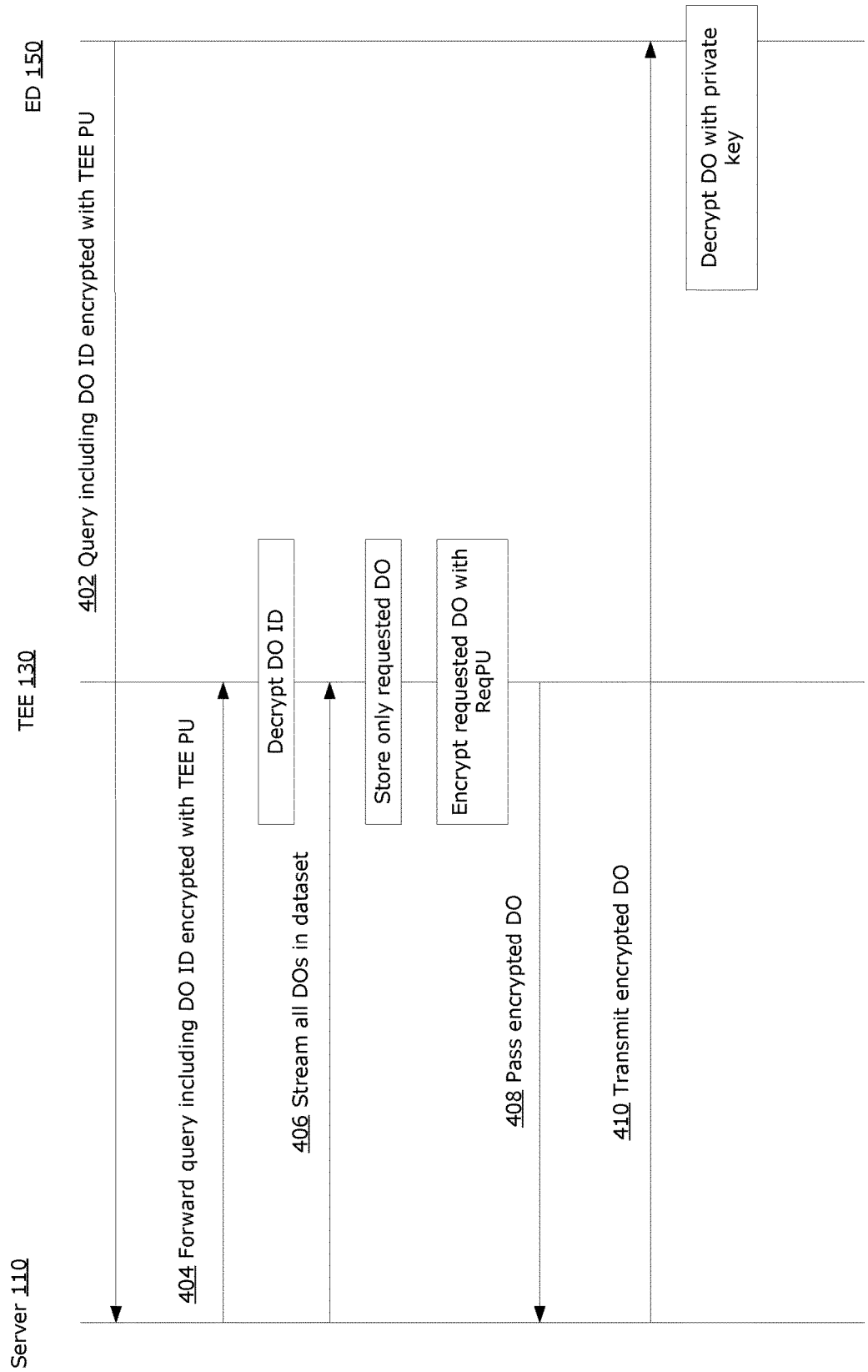
FIG. 4 is a signaling diagram representing an existing solution for content distribution.

FIG. 4 is a signaling diagram illustrating an example of a simple existing solution. In this example, multiple DOs are published (e.g., by the publisher 108) as a dataset. The dataset is then stored at a non-secure storage device (e.g., the storage unit 124 in FIG. 2) within the server 110. Within the server 110 are one or more TEEs 130 that can perform secure computations and store a protected private key signed by the TEE's manufacturer certificate authority (CA). The operator of the server 110 is considered Honest-But-Curious (HBC). That is, when performing the actions required to serve the ED's request, the server 110 does not reveal to the operator any information about which of the DOs within the dataset the ED 150 requested. Although the present disclosure describes some examples with reference to a HBC operator, it should be understood that the examples described herein may also be used in cases where the operator of the server 110 is not necessarily considered to be HBC, or where there are dishonest parties. For example, examples described herein may also be used in the case where a dishonest party (e.g., an unauthorized party) attempts to gain information, via unauthorized access to the server 110, about which DOs have been requested. It is assumed that the operator of the server 110 has information about what is stored on the server 110 and what is being sent from the non-secure storage, but does not have information about the operations performed with the TEE 130 within the server 110.

A request for a particular DO within the dataset may begin with a handshake between the ED 150 and the server 110. An example handshake procedure is first described. The ED 150 sends a handshake request to the server 110, which includes the identifier (ID) of the dataset containing the DO of interest, as well as a public key for the request (ReqPU). The server 110 responds to the handshake message with the public key of the TEE 130 (TEE PU) that has been designated to process the request, together with the digital signature of the TEE PU. The ED 150 verifies the digital signature using the public key provided by the CA of the TEE 130. Only the true TEE PU is signed by the CA. The corresponding private key of the TEE 130 (TEE PR) is fully secure and can only be used within the TEE 130. Accordingly, the ED 150 is guaranteed that any data encrypted with the TEE PU can only be decrypted using the TEE PR within the certified TEE 130. If the ED 150 verifies the digital signature, then the ED 150 may proceed to request the DO of interest. If the digital signature is not verified, then the ED 150 may abort the request.

Assuming that the handshake procedure was successful, then at 402 the ED 150 encrypts the ID of the requested DO using the TEE PU and transmits the query to the server 110.

The server 110 is unable to decrypt and read the query, and at 404 forwards the still-encrypted query to the TEE 130. The query is decrypted within the TEE 130, such that the ID of the requested DO is known within the TEE 130.

At 406, the server 110 transmits (e.g., streams) all DOs in the dataset (which was identified during the handshake procedure) from the non-secure data storage to the TEE 130. The TEE 130 receives each DO, but stores (e.g., in a local buffer) only the DO corresponding to (related to) the requested ID and discards all other DOs.

After 406, the TEE 130 encrypts the requested DO (which may be stored in the local buffer of the TEE 130) with the ReqPU and, at 408, sends the encrypted DO to the server 110 (i.e., sends the encrypted DO out of the protected environment of the TEE 130 into the general environment of the server 110).

At 410, the server 110 transmits the encrypted DO in a response message to the ED 150. Because the server 110 is unable to decrypt the encrypted DO, the server 110 has no knowledge of which DO has been transmitted to the ED 150. The ED 150 receives the encrypted DO and decrypts it using the ED's private key.

In the solution described above, OT was achieved. The DO request was served without the server 110 having any information on which of the DOs within the dataset was requested, thus assuring privacy to the ED 150. However, a problem is that all the DOs in the dataset had to be transmitted from the non-secure data storage to the TEE 130 to serve a single query. This may require significant consumption of resources, particularly if the DO is large (e.g., a large video file).

The present disclosure describes examples that help to reduce the size of the streamed data from the server 110 to the TEE 130 per query. In examples discussed below, there are multiple TEEs 130 in the server 110. The dataset is streamed from multiple buckets, each bucket containing only a portion of the data in the dataset, and each bucket being streamed to a respective different TEE 130. The TEEs 130 can also pool queries, meaning that multiple queries related to the same dataset can be processed simultaneously per each data stream. In the present disclosure, the term "bucket" or "data bucket" is used to refer to a buffer or other memory in which data is stored and from which the stored data may be streamed. In particular, data (e.g., a single DO) may be divided into separate portions (or "chunks") and stored over multiple buckets, as discussed further below. In the present disclosure, the term "chunk" or "data chunk" is used to refer to portions or fragments of data that are combined together to recover a DO. A data chunk by itself may not, by itself, provide any meaningful content. A data chunk may include formatting (e.g., a header) to enable the data chunk to be identifiable and manageable.

Existing solutions may make use of multiple buckets for parallel streaming to multiple TEEs, however the dataset is partitioned into data streams in a rigorous way that does not allow for grouping similar dataset segments together. Existing solutions require the data in the streams to come in a specific order so that the TEEs are able to match the streamed data chunks with the query.

In order to further reduce the size of the data stream to each TEE, examples discussed herein may reorder the data in the streams, taking into account statistical properties of the dataset, to enable data compression. This may result in lower computational and memory costs, compared to existing solutions.

The present disclosure also describes example techniques to enable each TEE to identify the appropriate data chunk to satisfy a query and to enable the receiving ED to recover the requested DO from the data chunks. Examples provided herein describe a technique for generating unique identifiers (also referred to as "fingerprints" or "fingerprint-based naming") that enables DOs to be properly recovered from data chunks which have been merged and reordered in some way. By enabling reordering and combining of data chunks, higher compression ratios may be achieved for each data stream.

Reference is again made to FIG. 1. The publisher 108 may (e.g., executing instructions in a publisher software program) take a dataset having multiple DOs (which may each be of equal size or unequal size) and divide the dataset over multiple buckets. The dataset may be divided into data chunks and placed in different buckets in such a way to enable higher compression, as will be discussed further below. The publisher 108 may further compress the data within each bucket. The dataset, divided among multiple buckets and compressed, may be transmitted by the publisher 108 to be stored on the third-party server 110. The server 110 may (e.g., executing instructions in an operator server program) store the dataset in the format provided by the publisher 108, and listen for data queries from the ED 150. The TEE 130 within the server 110 communicates with the operator server to satisfy data queries. The ED 150 (e.g., executing instructions in a customer client program) sends DO queries to the server 110 and, after receiving a reply to the query, reassembles the requested DO from the received data chunks.

Although the present disclosure may describe examples that are carried out by different entities in the system 100, it should be understood that aspects of the present disclosure may be entirely performed by a single entity.

Figure 5:
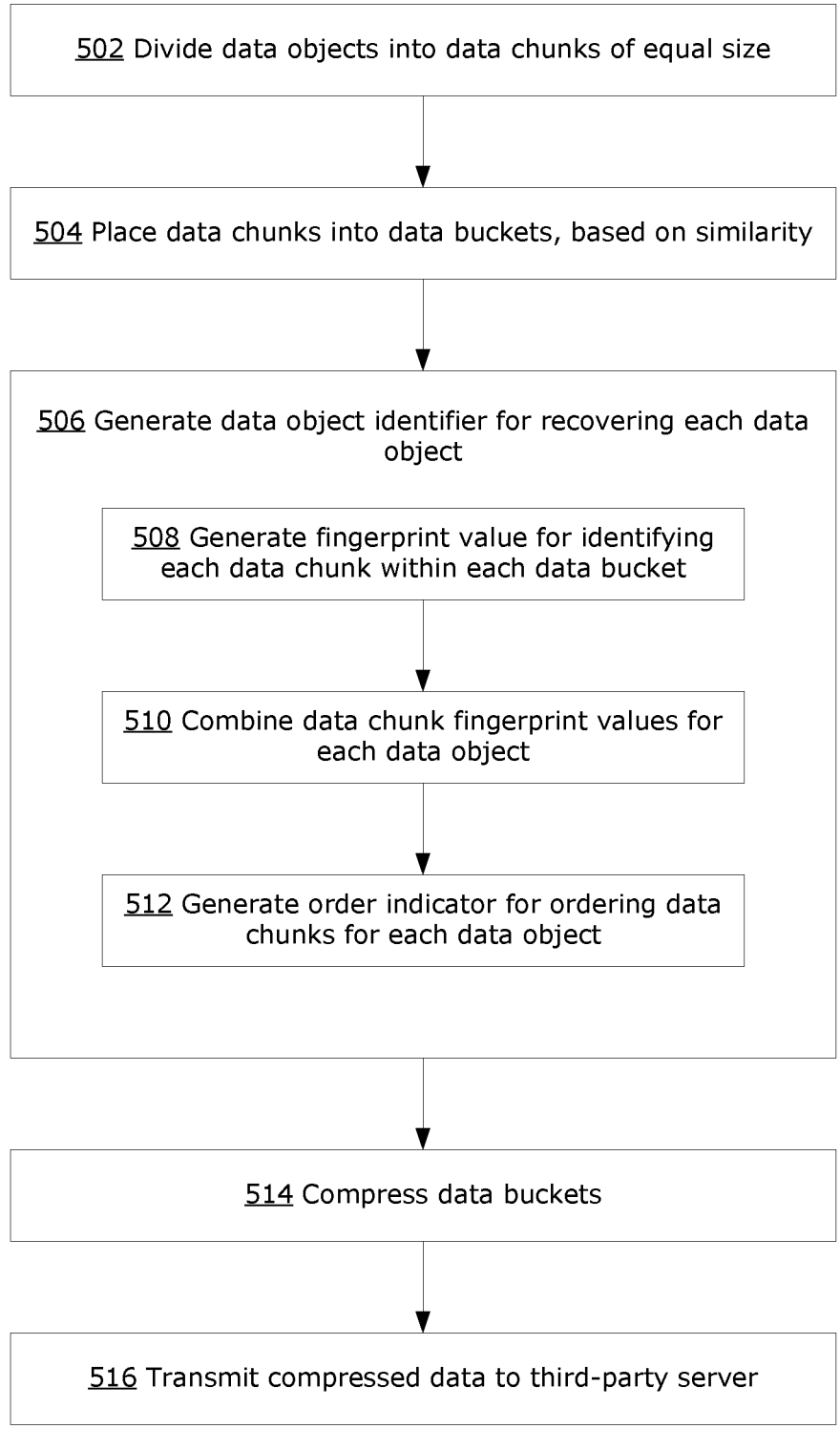
FIG. 5 is a flowchart illustrating an example method for generating data object identifiers, in accordance with examples described herein.

FIG. 5 is a flowchart illustrating an example method 500, which may be performed by the publisher 108, for formatting the dataset into data chunks and generating identifiers for the data chunks, is described. Although the following refers to operations performed by the publisher 108, it should be understood that any or all of the operations may be instead be performed by another entity, such as the third-party server 110, or another entity in the system 100.

The method 500 will also be described with reference to FIGS. 6A-6E, which illustrate an example instance of the method 500 being performed on an example data set.

At 502, the publisher 108 divides the DOs in a dataset into data chunks. The data chunks may be of equal size or of unequal size, as discussed below.

Figure 6A:
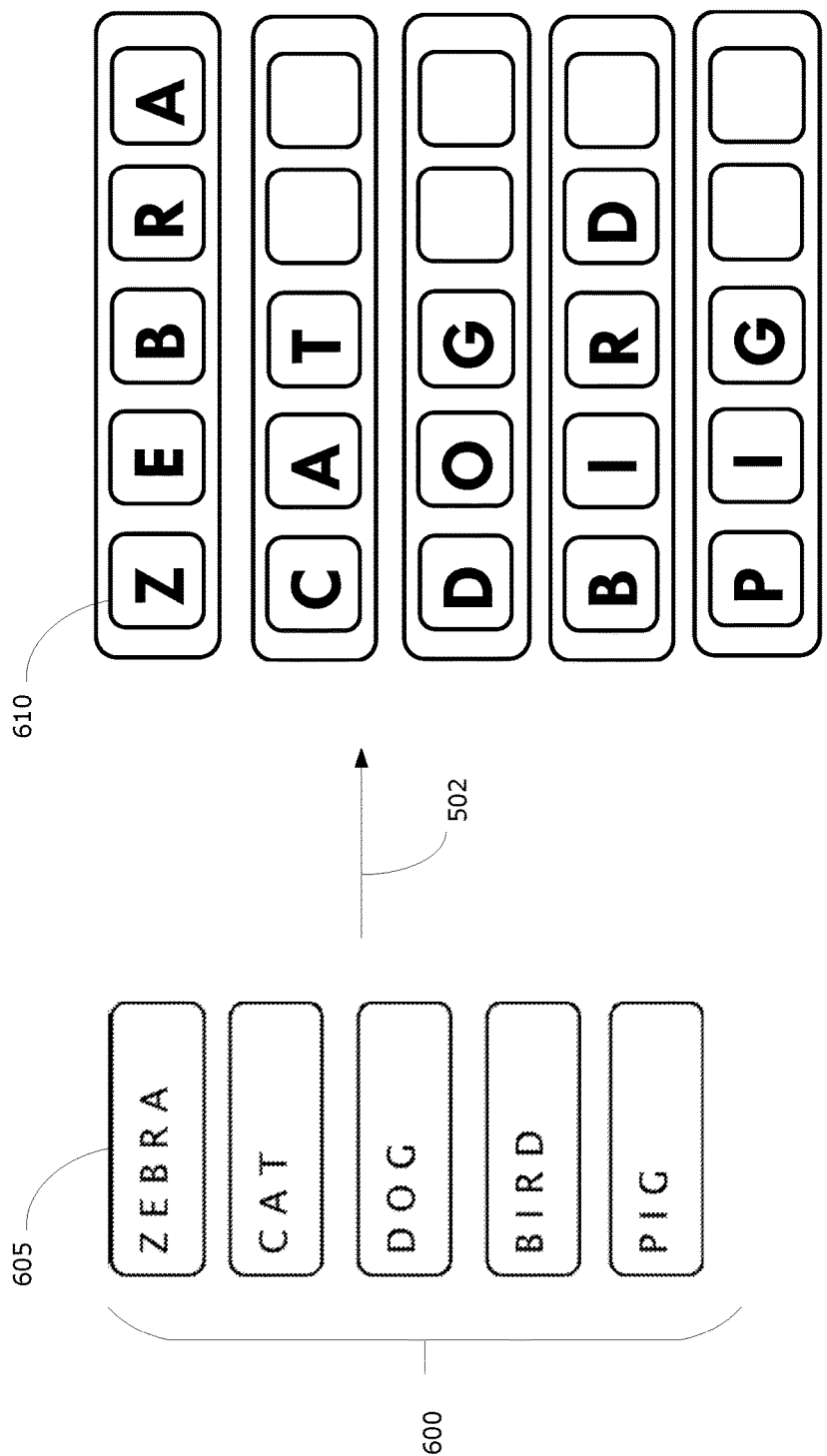
FIGS. 6A-6E are schematic diagrams illustrating example steps in implementing the method of FIG. 5.

FIG. 6A shows a simple example dataset 600. For example, the dataset 600 consists of five DOs 605 that are ASCII strings of animal names: "ZEBRA", "CAT", "DOG", "BIRD" and "PIG". The publisher 108 divides each DO 605 into a set of corresponding data chunks 610 (that is, data chunks 610 that correspond or relate to or were divided from the DO 605). In the simple example shown, each data chunk 610 may be of equal size (e.g., one byte in size). Generally, each data chunk 610 may have any suitable size, for example 128 Kb (or may be larger or smaller). The data chunks 610 may be of unequal size in some examples. For example, one or more of the data chunks 610 may be padded with dummy data (e.g., padded with random data or zeros, among other possibilities) to ensure that the data chunks 610 are of equal size and that each DO 605 is divided to equal numbers of data chunks 610. Equality in size and number of data chunks 610 corresponding to each DO 605 may help to ensure data privacy, because statistics about the size of the data could not be used to uniquely identify any DO 605. However, it is not necessary for the publisher 108 to ensure equal size of data chunks 610 or equal number of data chunks 610 per DO 605. In some examples, instead of such padding being performed at the publisher 108, a similar padding technique may be performed at the TEE, when responding to a query, to ensure that data chunks 610 that are sent from the TEE to the general environment of the server are statistically indistinguishable.

Figure 6B:
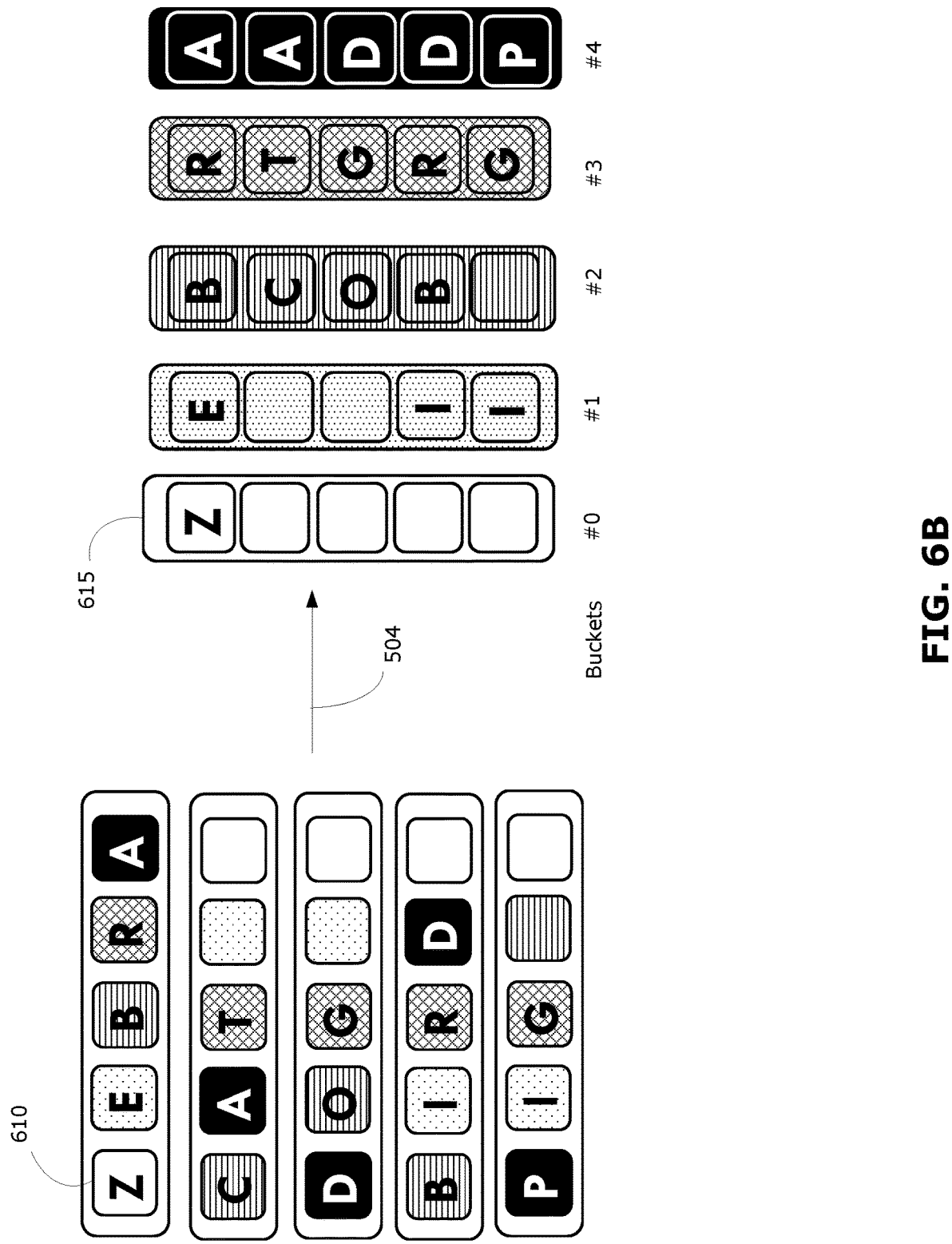

At 504, each data chunk 610 is placed into a bucket 615 (see FIG. 6B). Each data chunk 610 is assigned a specific bucket 615. In some examples, data chunks 610 may be assigned to buckets 615 such that each bucket 615 has an equal number of chunks 610 (e.g., exactly one chunk 610) from each DO 605. As previously noted, one or more data chunks 610 may contain empty data or be filled/padded with random data or zeros. This enables each bucket 615 to have equal numbers of data chunks 610 and for each data chunk 610 to be equal in size. This in turn helps to ensure data privacy because statistics about the way data chunks 610 are distributed among the buckets 615 could not be used to uniquely identify any data chunk 610 from any DO 605. However, in some examples there may be different numbers of data chunks 610 in different buckets 615 and various techniques may be used to ensure data privacy despite this, as discussed below.

Although the present disclosure describes some examples in which each DO 605 is split into corresponding data chunks 610 of equal size, and each bucket 615 is assigned an equal number of chunks 610, it should be understood that this is not intended to be limiting. For example, a DO 605 may be split into corresponding data chunks 610 of different sizes, DOs 605 may be split into different numbers of corresponding data chunks 610, buckets 615 may be assigned different numbers of data chunks 610, and variations thereof. Various techniques may be used to ensure data privacy, even when there are such variations in the size and/or number of data chunks 610 in the buckets 615. For example, if data chunks 610 are unequal in size, padding (e.g., with random data or zeros) may be used to make the data chunks 610 appear to be of equal size from the viewpoint of an outside observer (e.g., an operator of the server). In another example, if unequal numbers of data chunks 610 are assigned to different buckets 615, a given bucket 615 may contain no data chunk 610 from a specific DO 605. In that case, the given bucket 615 may instead be assigned a block of dummy data (e.g., a block of random data) that appears to be a data chunk (e.g., having the same size). As mentioned above, such techniques that hide distinguishing information may be performed by the publisher 108 when dividing and assigning data chunks 610 among buckets 615, or may be performed by the TEE when responding to a query.

It should be noted that the chunks 610 are not placed in the buckets 615 in an arbitrary manner, and not simply assigned buckets 615 sequentially or according to the order of the chunks 610 in each DO 605. Rather, the chunks 610 are assigned to respective buckets 615 and ordered within each bucket 615 in such a way so that more similar chunks 610 are grouped and ordered to be closer together in the same bucket 615.

In FIG. 6B, for example, the data chunk "A" from the DO "ZEBRA" is assigned to bucket #4 and is positioned close to the data chunk "A" from the DO "CAT" in the same bucket #4. Notably, the data chunks "C", "A", "T" and two (space character) chunks are reordered when assigned to buckets #0-4, compared to the order of bucket assignment for the data chunks from "ZEBRA". That is, the first data chunk 610 in each DO 605 are not all necessarily assigned to the same "first" bucket 615, and similarly for the second data chunk 610 and so forth. In other words, the "bucket order" by which data chunks 610 of a DO 605 are assigned to the buckets 615 may be different from the original order in which the data chunks 610 are arranged in the DO 605. This is different from assigning each data chunk 610 to a bucket 615 according to the order in which the data chunk 610 appears in the original DO 605. By using the similarity of data chunks 610 to assign and order the chunks 610 within the buckets 615, better data compression may be achieved.

The similarity of data chunks 610 is used as the basis for assigning buckets 615 and ordering chunks 610 within buckets 615. Similarity of two data chunks 610 may be determined using any suitable calculation. One example is the calculation of the Kullback-Leibrer (KL) divergence comparing probability distribution of tokens of an unassigned candidate chunk 610 and the chunk(s) 610 already assigned to a given bucket 615.

An example calculation that may be performed to calculate the KL divergence is:

$$M = \sum_{x \in X} Q(x)\log\left\{\frac{Q(x)}{S(x)}\right\} + \sum_{x \in X} P(x)\log\left\{\frac{P(x)}{S(x)}\right\}$$

where M is a mutual information metric representing the similarity between two tokens, Q(x) is the token probability distribution function for the given bucket 615, P(x) is the token probability distribution function for the unassigned candidate chunk 610 and S(x) is the joint probability distribution function of the bucket 615 and the unassigned chunk 610. The term $$\Sigma_{x \in X} Q(x)\log\left\{\frac{Q(x)}{S(x)}\right\}$$

may be represented as KL(Q(x)∥S(x)) and the term $$\Sigma_{x \in X} P(x)\log\left\{\frac{P(x)}{S(x)}\right\}$$

may be represented as KL(P(x)∥S(x)). For example, if the candidate data chunk 610 is the same size as the given bucket 615:

$$S(x) = \frac{1}{2}\{Q(x) + P(x)\}$$

Therefore, M may be rewritten as:

$$M = \sum_{x \in X} Q(x)\log\left\{\frac{2Q(x)}{P(x) + Q(x)}\right\} + \sum_{x \in X} P(x)\log\left\{\frac{2P(x)}{P(x) + Q(x)}\right\}$$

where the term $$\Sigma_{x \in X} Q(x)\log\left\{\frac{2Q(x)}{P(x) + Q(x)}\right\}$$

may be represented as KL(Q(x)∥1/2(Q(X)+P(X))) and the term $$\Sigma_{x \in X} P(x)\log\left\{\frac{2P(x)}{P(x) + Q(x)}\right\}$$

may be represented as KL(P(x)∥1/2(Q(X)+P(X))).

Thus, another way to think of how data chunks 610 are placed in data buckets 615 is that chunks 610 are grouped into buckets 615 in such a way such that the total cross entropy of the chunks 610 within each bucket 615 is minimized.

An example algorithm is described below, which uses KL as a metric of how similar a given unassigned data chunk C is to a given bucket B.

Assume the token size is fixed, for example, one byte.

The data chunk C is parsed to calculate the number of each unique token this chunk has. For example, if the chunk contains five letters "L", then $N_C("L")=5$. The total number of tokens in the chunk is denoted as $T_C$. For example, if the chunk size is 14 bytes and the size of the token is fixed at 2 bytes, then:

$$T_C = 14/2 = 7$$

The same is done for the bucket B. If the bucket B contains 17 "L" tokens, this is denoted as $N_B("L")=17$. $T_B$ is the total number of tokens in the bucket B.

Then the pseudo code for the example algorithm is:
KL=0
For x each unique token in C:

$$KL=KL+N_C(x)*\text{Log}[N_C(x)+N_B(x)]$$

Return KL

It should be noted that this calculation is just an example. Any suitable metric may be used to measure similarity (e.g., measures mutual information or cross entropy), or to reflect how well two sets of data can be compressed together.

In the example of FIG. 6B, because each data chunk 610 consists of a single ASCII character, the placement of chunks 610 by similarity is relatively simple. For example, the ASCII character in one data chunk 610 is identical or not identical to the ASCII character in another data chunk. In a more complicated example, each data chunk 610 may consist of two ASCII characters. For example, a data chunk "BB" may be placed together with and closer positioned with a data chunk "BR" in a given bucket 615 based on a calculation of similarity, whereas the data chunk "BB" and the data chunk "RA" may be placed further apart in the given bucket 615 or may be assigned to different buckets 615.

At 506, after the data chunks 610 have all been placed among the buckets 615, the publisher 108 generates DO identifiers for recovering each DO from the respective corresponding data chunks 610 among the buckets 615. This may be performed using steps 508-512.

At 508, a unique identifier, referred to herein as a fingerprint value, is generated for identifying each data chunk 610 within each data bucket 615. This may be performed using a fingerprint function. An example fingerprint function for a given bucket 615:

$$F(x)=x \bmod p$$

where x is a numerical value representing the data chunk 610, mod is the modulo operator, and p is a prime number. The value p may be referred to as a characteristic value of the given bucket 615. The value p for any given bucket 615 may be determined probabilistically or through trial-and-error, for example. It should be noted that p should be greater than the number of unique data chunks 610 in the bucket 615 in order for the unique data chunks 610 to be uniquely distinguishable. It should also be noted that different buckets 615 may have the same characteristic value p.

To implement the example fingerprint function described above, the smallest p is found for a given bucket 615 such that a distinct fingerprint value F(x) is obtained for every unique data chunk 610 in the bucket. The smallest p is desired in order to keep the fingerprint values as small as possible, thus reducing the number of bits required to represent each fingerprint value. Generally, the minimum number of bits required to reference a data chunk 610 within a given bucket 315, using the fingerprint value, is the number of binary bits required to represent the characteristic value p, which may be calculated as the rounded up integer value of $\log_2$ of p. This number of bits may be referred to as the fingerprint size or c, and may be expressed as:

$$c=\text{roundup}(\log_2(\text{max fingerprint in bucket}))$$

Figure 6C:
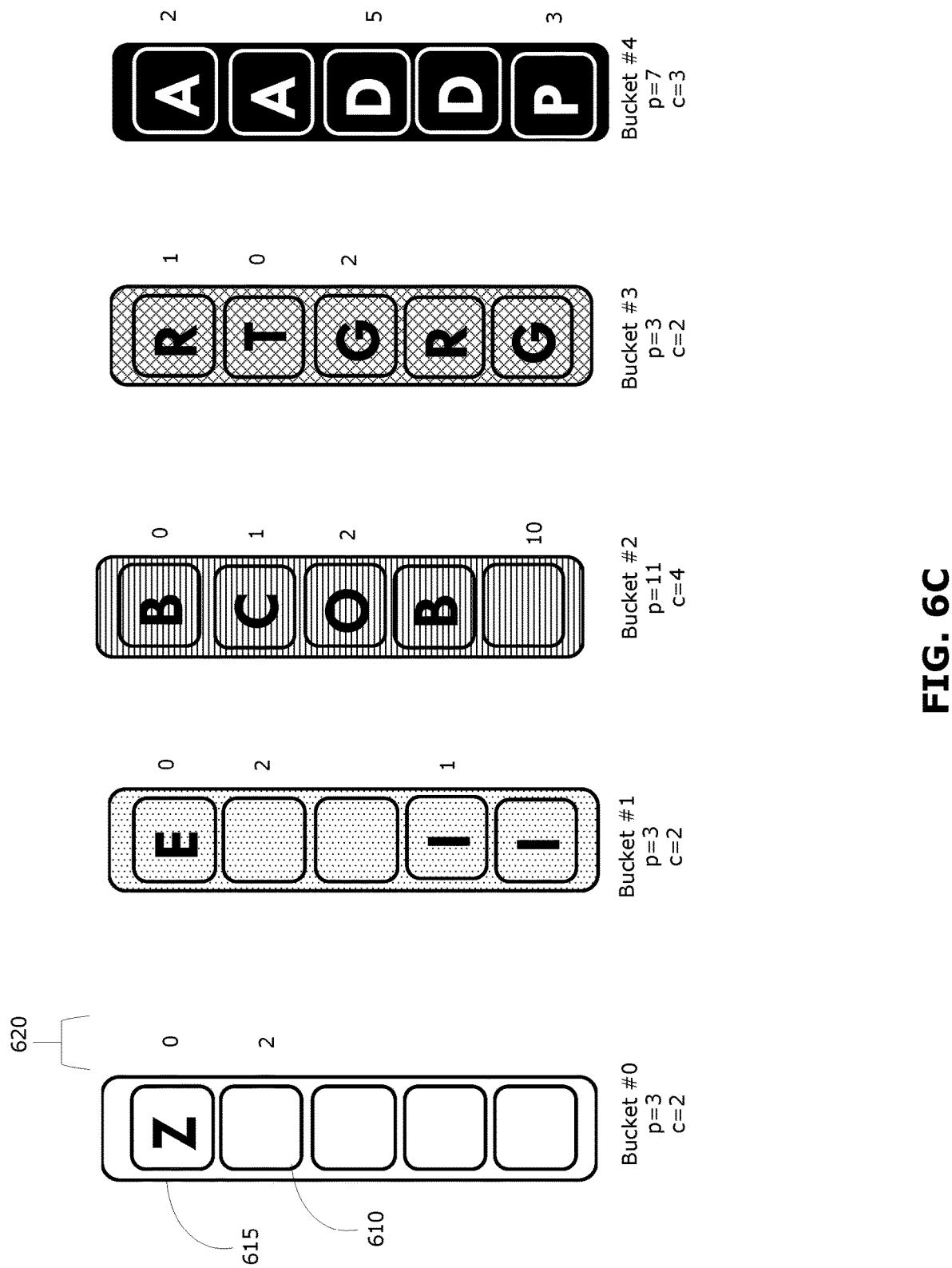

FIG. 6C illustrates an example implementation of the fingerprint function F(x) described above. In this example, the data chunks 610 in bucket #0 may be uniquely identified using 3 as the characteristic value p. In other words: F(x)=x mod 3.

x is a numerical representation of each data chunk 610. In this example, x is the numerical equivalent of the ASCII character contained in each data chunk 610. For example, the ASCII character "Z" has the numerical value 90. Thus, the fingerprint value for the data chunk 610 containing "Z" is:

$$F(90)=90 \bmod 3=0$$

Further, the characteristic value p=3 results in:

$$c=\text{roundup}(\log_2(3))=2$$

In a similar manner, the fingerprint values 620 shown in FIG. 6C may be calculated for each data chunk 610 in each bucket 615, with respective characteristic values p and the bucket characteristic c. It may be noted that data chunks 610 that contain identical data (e.g., identical ASCII characters) have the same fingerprint value 620. Further, it may be noted that the fingerprint value 620 uniquely identifies data chunks 610 only within a given bucket 615 (e.g., "Z" in bucket #0 and "E" in bucket #1 have the same fingerprint value of 0).

An example fingerprint function is discussed above. Different fingerprint functions may be used. Generally, the fingerprint function should be a function that, when applied to each data chunk 610, is able to generate a unique value for each unique data chunk 610 in a given bucket 615. Further, the fingerprint function may be selected such that the generated fingerprint value 620 is relatively small, in order to reduce the number of bits required to represent the fingerprint value 620. It should be understood that, depending on the fingerprint function that is used, the bucket characteristic value p and the fingerprint size c may have different meanings, the bucket may be characterized in different ways, or there may not be any bucket characteristic value.

Using the fingerprint function, a unique identifier (referred to herein as the fingerprint value 620) is generated for identifying each data chunk 610 within each data bucket 615. By referencing a specific bucket 615 and a specific fingerprint value 620, a specific desired data chunk 610 can be identified (e.g., to be stored and transmitted, as discussed further below).

At 510, the fingerprint values 620 for the data chunks 610 corresponding to each DO 605 are combined. Combining the fingerprint values 620 may be simply concatenating the bits representing the fingerprint values 620, in the order in which the respective data chunks 610 appear in the DO 605. Alternatively, the fingerprint values 620 may be concatenated according to the sequential order of the buckets 615.

Referring again to FIG. 6C, for example, the DO 605 "ZEBRA" can be identified by combining the fingerprint values 620 for the corresponding data chunks 610 "Z", "E", "B", "R" and "A" in each data bucket 615 as illustrated in the following table:

| Z | E | B | R | A |
|---|---|---|---|---|
| 0b00 | 0b00 | 0b0000 | 0b01 | 0b010 |
| (bucket #0) | (bucket #1) | (bucket #2) | (bucket #3) | (bucket #4) | where the notation "0b" indicates a binary integer. The bucket 615 for each data chunk 610 is indicated in parentheses.

In the example "ZEBRA", the corresponding data chunks 610 are placed into the buckets 615 in a bucket order matching the original order in which the data chunks 610 occur in the DO 605:

| | Z | E | B | R | A |
|---|---|---|---|---|---|
| Original order | 0 | 1 | 2 | 3 | 4 |
| Bucket order | 0 | 1 | 2 | 3 | 4 | where index numbers start at 0.

However, this is not necessarily true. For example, the DO 605 "CAT" has the corresponding data chunks "C", "A" and "T", and two empty chunks placed in the buckets 615 in a bucket order that differs from the original order, as illustrated in the tables below:

| C | | A | | T | | | | |
|---|---|---|---|---|---|---|---|---|
| 0b0001 | | 0b010 | | 0b00 | | 0b10 | | 0b010 |
| (bucket #2) | | (bucket #4) | | (bucket #3) | | (bucket #0) | | (bucket #1) |

| | C | A | T | | |
|---|---|---|---|---|---|
| Original order | 0 | 1 | 2 | 3 | 4 |
| Bucket order | 2 | 4 | 3 | 0 | 1 |

Because the data chunks 610, at step 504, are placed into data buckets 615 based on similarity and not based on sequential order, it is possible that a given DO 605 cannot be recovered simply by taking data chunks 610 from the data buckets 615 sequentially.

At 512, a permutation token is generated. The permutation token provides information for reordering the corresponding data chunks 610 taken from each bucket 615, so that the desired DO 605 is recovered. In the example of "CAT" above, the permutation token indicates that the corresponding data chunk 610 taken from bucket #2 should be first, followed by the corresponding data chunk 610 from bucket #4, and so forth.

In an example, the permutation token may be based on the Lehmer permutation coding algorithm. The Lehmer code is a technique for encoding a particular permutation in a sequence of numbers. Broadly speaking, the Lehmer code is a way to express a selection from a sequence of n numbers, where each selection reduces the remaining numbers available for a subsequent selection.

Figure 6D:
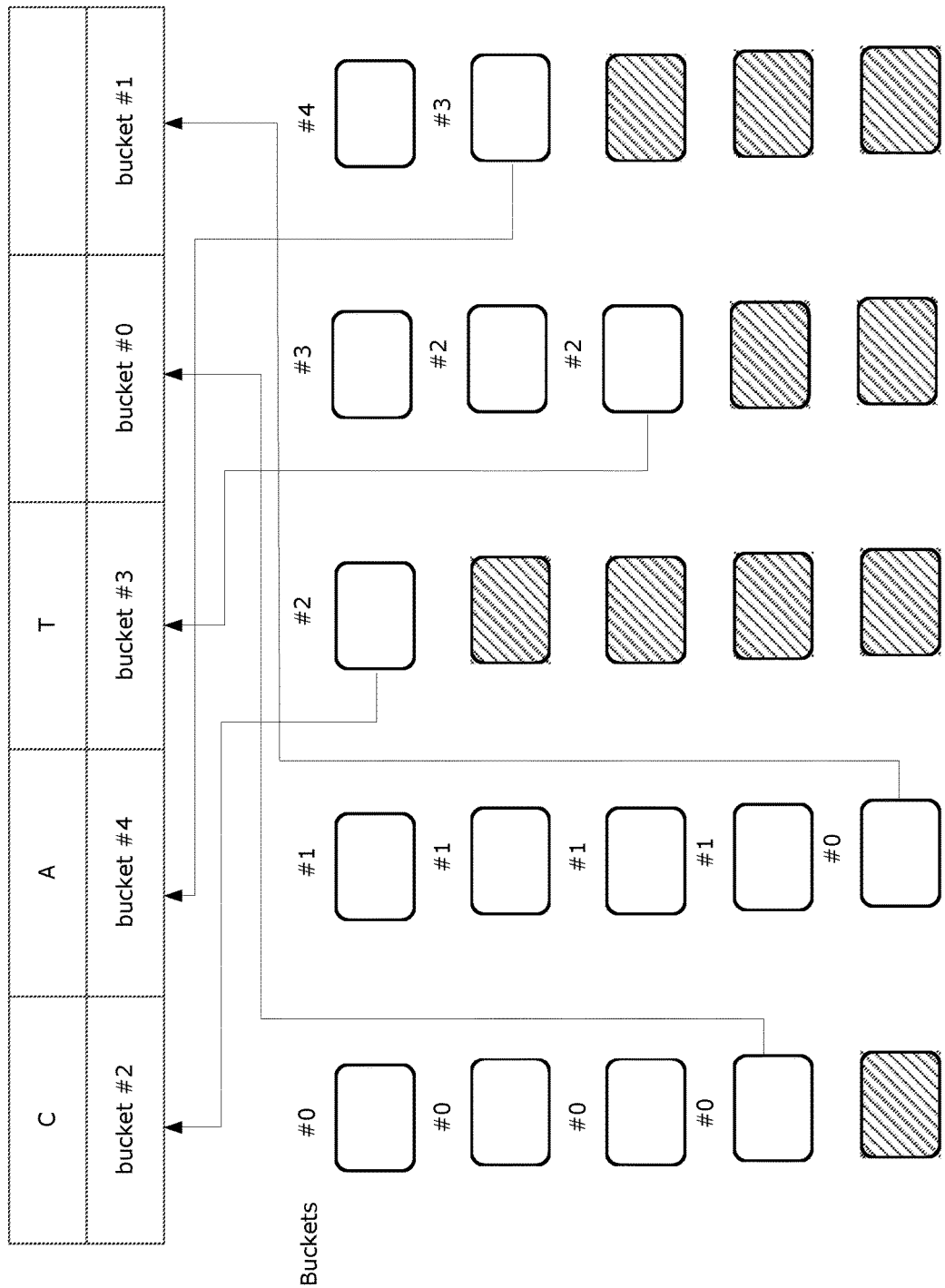

FIG. 6D illustrates an example of this technique. In this example, the DO 605 "CAT" is recovered by taking corresponding data chunks 610 from respective buckets 615 according to the bucket order: [#2, #4, #3, #0, #1]. After taking the first corresponding data chunk 610 "C" from bucket #2, bucket #2 is no longer available (as discussed at step 504 above, each bucket 615 contains only one corresponding data chunk 610 from each DO 605), which is indicated in FIG. 6D by shading out this bucket. Further, the remaining buckets 615 can be renumbered as buckets #0-#3. In a similar way, the corresponding data chunk 610 "A" is next taken from bucket #4 which has been renumbered as #3, and this bucket then is no longer available (as indicated by shading). The process is continued until all corresponding data chunks 610 have been taken from the appropriate buckets 615. According to the order in which each corresponding data chunk 610 has been taken from the buckets 615 and accounting for renumbering of the buckets 615 at each step, the permutation may be represented by the sequence: [2, 3, 2, 0, 0].

From this sequence, the permutation token T, may be generated by multiplying with factorials as follows:

$$T = 2*4! + 3*3! + 2*2! + 0*1! = 70$$

which may be represented by the bit integer 0b1000110.

It may be noted that, in this example having five buckets, the value of T is bounded by a lower value of 0 and an upper value of 5!. Because of this upper bound, the permutation token can be represented by a number of bits equal to the rounded up integer value of $\log_2((\text{total number of buckets})!)$. In this example, the number of bits required to represent the permutation token is $\text{roundup}(\log_2(5!))=7$.

Other methods of generating the permutation token may be used. Generally, the permutation token may be any set of bits that indicate the order in which data chunks taken from the different buckets should be ordered. For example, the permutation token may be any suitable way for representing the bucket order, or any suitable way for representing the difference between the bucket order and the original order. Generating the permutation token in the manner described above may be useful because the number of bits required to represent the permutation token may be relatively small.

Although the Lehmer code is described as an example, it is not intended to be limiting. Any technique may be used to distinguish the ordering (or permutation) of the corresponding data chunks 610. The permutation token may be encoded using a number of bits equal to the rounded up integer value of $\log_2((\text{total number of buckets})!)$.

After the data chunk fingerprint values and the permutation token have been generated for each DO 605, the DO identifier may be generated for each DO 605 by combining the fingerprint values of the corresponding data chunks 605 and the permutation token. For example, the permutation token may be concatenated with the fingerprint values, such as in the examples below:

| Permutation token | Z | E | B | R | A |
|---|---|---|---|---|---|
| 0b0000000 | 0b00 | 0b00 | 0b0000 | 0b01 | 0b010 |

| Permutation token | C | A | T | | |
|---|---|---|---|---|---|
| 0b1000110 | 0b0001 | 0b010 | 0b00 | 0b10 | 0b010 | such that the DO "ZEBRA" can be represented by the identifier 0b00000000000000001010, which translates to the hexadecimal value 0x0000A0; and the DO "CAT" can be represented by the identifier 0b1000110000101000010010, which translates to the hexadecimal value 0x8C2890 (where the notation 0x indicates a hexadecimal value). Any other number base may be used to express the identifier.

The above examples result in a DO identifier in which there is first a set of permutation token bits (representing the permutation token), followed by multiple sets of fingerprint value bits that each represent fingerprint values that correspond to a respective data chunk of the DO. The order in which these sets of bits are arranged in the DO identifier may be different than that shown above. For example, the set of permutation token bits may be placed at the end of the DO identifier instead of at the beginning. In another example, the sets of fingerprint value bits may be arranged based on bucket order (e.g., the fingerprint value bits for the corresponding data chunk in bucket #0 is followed by the fingerprint value bits for the corresponding data chunk in bucket #1, and so forth) rather than being arranged based on order of the corresponding data chunks in the DO. Generally, the configuration of the bits in the DO identifier may be predefined and known to both the publisher 108, the TEE 130 and the ED 150 (e.g., according to a known standard, or communicated by the publisher 108), to enable the TEE 130 to parse the DO identifier and to enable the ED 150 to recover the DO, as discussed further below.

The publisher 108 may create a reference (e.g., a lookup table) to associate each DO 605 with the respective DO identifier. This information may be published 108 together with the compressed data (discussed below) to enable proper recovery of each DO 605.

At 514, each data bucket 615 is compressed. As previously discussed, data chunks 610 are placed into respective buckets 615 based on data similarity. Further, data chunks 610 within a given bucket 615 are ordered such that more similar data chunks 610 are placed closer together. Reordering data chunks 610 in this way is intended to achieve highest local similarity, or lowest cross entropy.

Figure 6E:
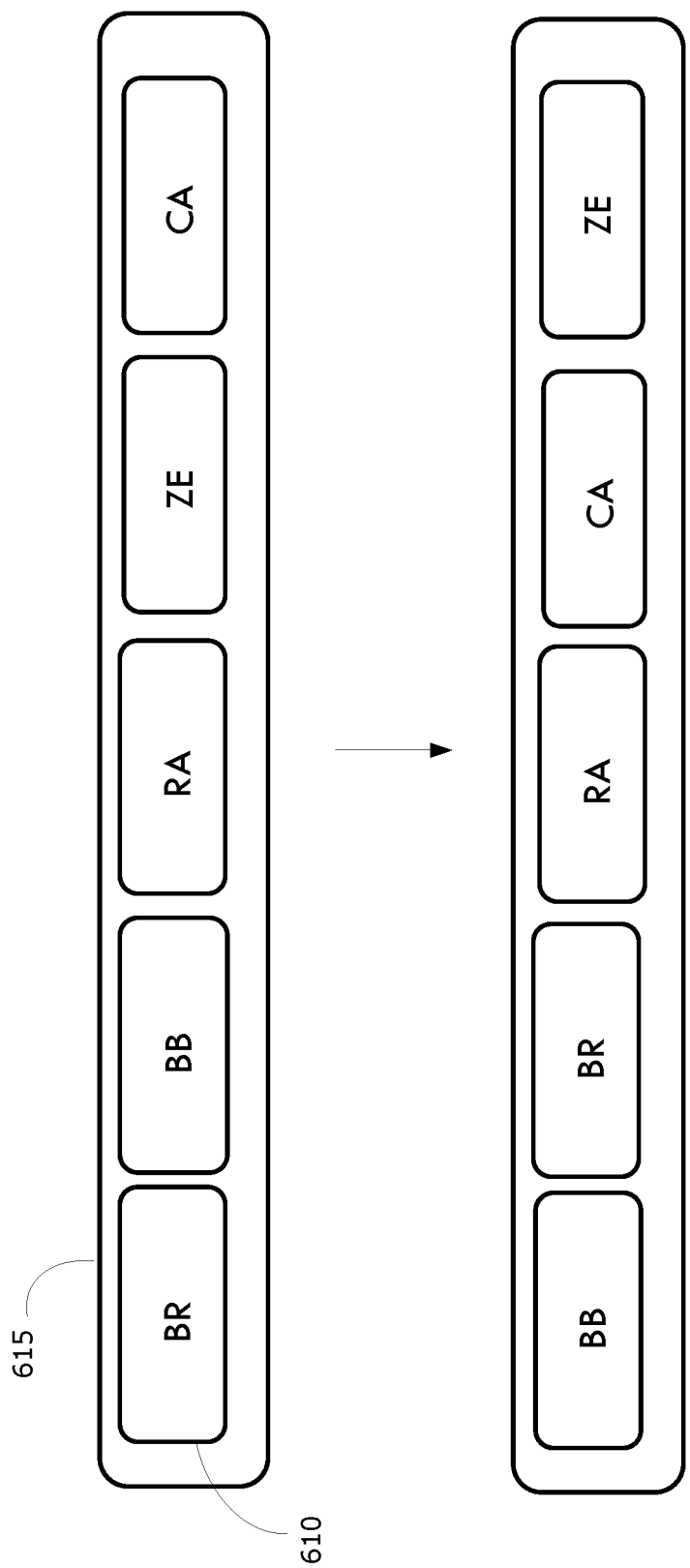

In FIG. 6E, for example, data chunks 610 each containing two ASCII characters may be reordered such that more similar data chunks 610 are placed closer together. For example, the data chunks 610 "BB" and "BR" are placed closer together, and the data chunks 610 "RA" and "CA" are also placed closer together.

In some examples, ordering the data chunks 610 by similarity within a given data bucket 615 may be performed as part of step 504. For example, an unassigned data chunk 610 may be placed into a given bucket 615 and ordered among other data chunks 610 already assigned to the bucket 615 based on similarity. In some examples, data chunks 610 within a given bucket 615 may be ordered according to similarity after all data chunks 610 have been placed within the bucket 615. In yet other examples, the data chunks 610 may be ordered within a given bucket 615 at step 514, as part of or just prior to performing compression. It should be noted that the order of the data chunks 610 within the data buckets 615 does not affect the generation of the DO identifier described above.

Grouping and ordering the data chunks 610 in buckets 615 in the manner described above may be useful for achieving higher compression ratios. Each bucket 615 contains data chunks 610 with relatively high mutual information (which may be thought of generally as high similarity), and within each bucket 615 the chunks 610 are ordered in such a way so that the chunks 610 with higher mutual information tend to be closer to each other. These properties are expected to result in higher compression ratios when the bucket 615 is compressed with a suitable adaptive statistical encoding compression algorithm.

In some examples, compression of the data bucket 615 may result in fewer data chunks 610 than were originally assigned to the bucket 615. For example, if the bucket 615 contains two identical data chunks 610, only one instance of the data chunk 610 may be retained in the compression. For example, bucket #0 in FIG. 6C contains one instance of "Z" and four instances of " " (space character) data chunks 610. The compressed data for bucket #0, when decompressed, may contain one instance of "Z" and only one instance of " " (space character). Because fingerprint values 620 are used to identify data chunks 610 in a given bucket 615, and identical data chunks 610 have the same fingerprint value 620, it is not necessary for multiple instances of identical data chunks 610 to be preserved in the compressed data. This is useful not only for improving compression, but may also be useful in reducing the data that must be streamed from the server 110 to the TEE 130, in processes discussed further below.

At 516, the publisher 108 publishes the compressed data for the dataset 600, for example by transmitting the compressed data for each bucket 615 to the third-party server 110. The publisher 108 may publish the dataset ID along with the compressed data. The publisher 108 may further provide information about the buckets 615, which will be used by the server 110 (and in particular the TEE 130 within the server 110) to respond to a query for a DO 605 in the dataset. Such information about the buckets 615 may include, for example, the compression algorithm used, the characteristic value p for each bucket 615, the fingerprint function used to generate fingerprint values for the data chunks 610 within the buckets 615, and optionally the number of bits c encoding the fingerprint values for each bucket 615 (if c is not provided by the publisher 108, c may be calculated based on the characteristic value p, as discussed above). The manner in which the publisher 108 has generated the DO identifiers may be predefined and known to the TEE 130, to enable the TEE 130 to extract the relevant information from the DO identifiers, as discussed further below.

The publisher 108 may also make available to the ED 150 (e.g., published on the third-party server 110 and/or other publicly available database) the dataset ID that the ED 150 may use in a query to the server 110. The publisher 108 further makes available information about the DO identifiers, for example in the form of a lookup table or other reference that enables the DO identifier for a desired DO in the dataset to be determined. In some examples, the publisher 108 may not need to make available to the server 110 any information referencing the DO identifiers to specific DOs 605 in the published dataset 600.

After performing the example method 500, the dataset 600 is available on the third-party server 110 to be queried by and distributed to one or more EDs 150.

Figure 7:
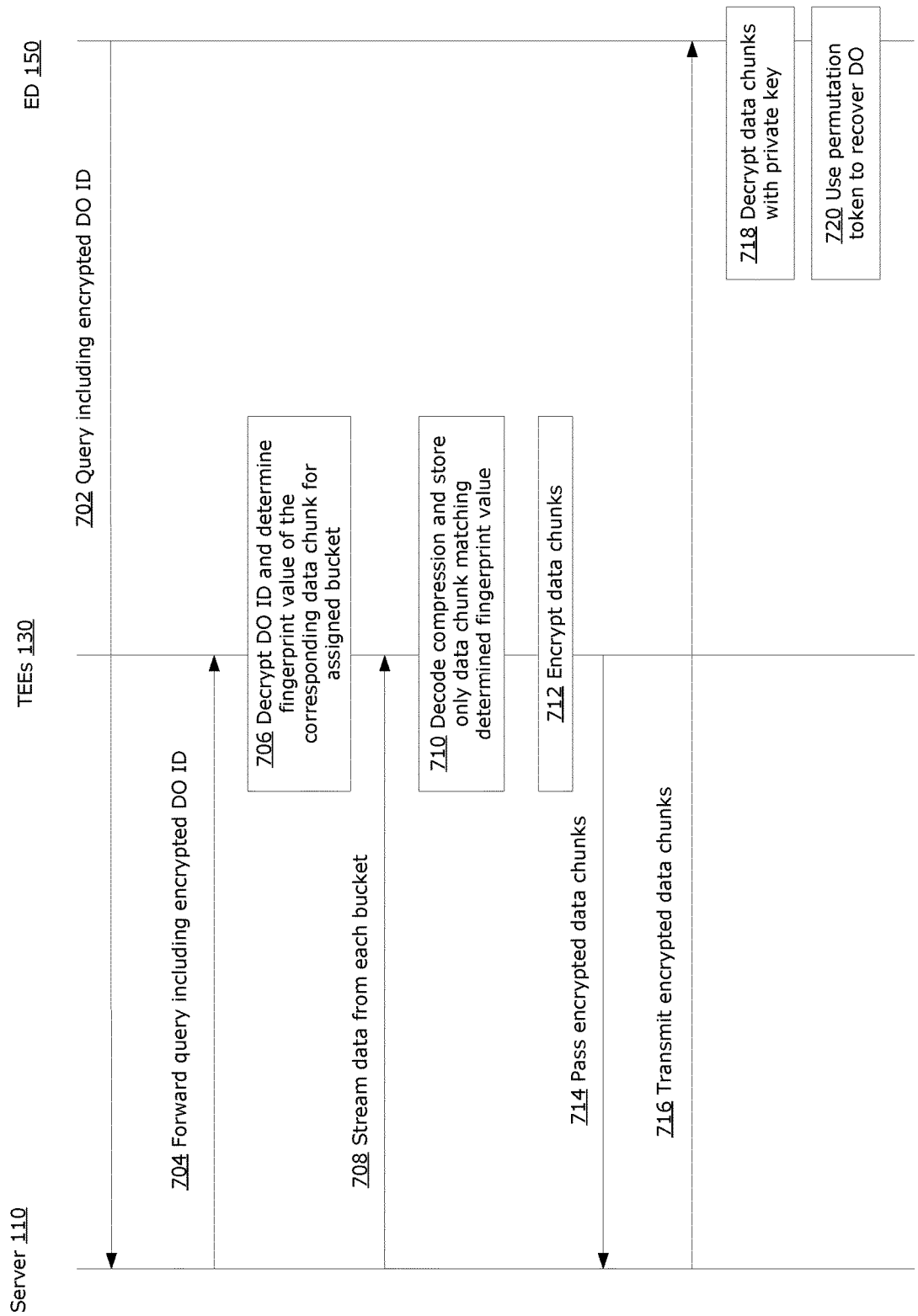
FIG. 7 is a signaling diagram representing an example of content distribution, in accordance with examples described herein.

FIG. 7 is a signaling diagram illustrating an example of content distribution, in accordance with examples disclosed herein. The operations of FIG. 7 may take place after the dataset has been compressed and published, for example as discussed above with respect to FIG. 5. The example of FIG. 7 involves operations by the server 110, multiple TEEs 130 within the server 110, and the ED 150. The server 110 stores the dataset in a non-secure storage device (e.g., the storage unit 124 in FIG. 2) within the server 110. The dataset is stored at the server 110 as compressed bucket streams, where the compressed buckets have been generated using the method of 500 for example. The number of TEEs 130 within the server 110 is at least equal to the number of buckets in which the DOs of the dataset is stored; there may be a greater number of TEEs 130. The TEEs 130 have a set of public and private keys that have been digitally signed by the TEE's manufacturer CA. The private key is protected by hardware features and the digital signature can be verified to prove that the key is indeed the protected TEE key. The operator of the server 110 is considered HBC. It is assumed that the operator of the server 110 has information about what is stored on the server 110 and what is being sent from the non-secure storage, but does not have information about the operations performed with the TEE 130 within the server 110.

A request for a particular DO within the dataset may begin with a handshake between the ED 150 and the server 110. The handshake process is similar to that discussed above with respect to FIG. 4, and will only be briefly described here. The ED 150 sends a handshake request to the server 110, includes the ID of the dataset containing the DO of interest, as well as the public key for the request (ReqPU).

The server 110 responds to the handshake message with the public key of the TEEs 130 (TEE PU), together with the digital signature of the TEE PU. The ED 150 verifies the digital signature using the public key provided by the CA of the TEE 130. If the ED 150 verifies the digital signature, then the ED 150 may proceed to request the DO of interest. If the digital signature is not verified, then the ED 150 may abort the request.

Having validated the digital signature, the ED 150 may proceed to transmit the query to the server 110. At 702, the ED 150 transmits the query to the server 110. The query includes the encrypted DO ID (e.g., encrypted with the TEE PU). Notably, the DO ID included in the query at 702 is encoded with information (e.g., fingerprint values as discussed above) identifying corresponding data chunks of the DO stored in each bucket, and the DO ID is further encoded with information (e.g., permutation token as discussed above) for ordering the corresponding data chunks in order to recover the DO. In particular, the DO ID may be the identifier that was generated using the example method of 500.

After receiving the query, the server 110 assigns TEEs 130 to process the query. In particular, the server 110 has information about which dataset is being queried (but not which DO within the dataset) and about the number of buckets over which DOs of the dataset is stored. Accordingly, the server 110 assigns one TEE 130 to process each bucket associated with the dataset, such that the total number of assigned TEEs 130 is equal to the total number of buckets associated with the dataset. Each TEE 130 is also provided with information about the characteristic value p of its assigned bucket. For example, the characteristic value p for each bucket may be known to the server 110 (e.g., published by the publisher), and the server 110 may provide the appropriate information to each TEE 130.

At 704, the encrypted query, including the DO ID, is forwarded to each of the TEEs 130. It may be noted that the same encrypted query is forwarded to each TEE 130, because the server 110 has no knowledge of which TEE 130 will be responsible for retrieving which data chunk from the respective assigned bucket.

At 706, each TEE 130 decrypts the query (using the TEE private key (TEE PR)). Each TEE 130 may parse the DO ID according to the known configuration of the DO ID. For example, each TEE 130 may identify which bits in the DO ID correspond to the set of fingerprint value bits that is relevant for its assigned bucket. Each TEE 130 thus determines, from the DO ID, the correct fingerprint value of the corresponding data chunk for its respective assigned bucket.

At 708, the server 110 streams the compressed data stream for each bucket to the respective assigned TEE 130.

Each TEE 130 receives, from the server 110 into the respective TEE 130, the compressed data stream for its respective assigned bucket. For simplicity, the operations of a single given TEE 130 assigned to a given bucket is now described. It should be understood that the following operations are performed at each TEE 130 assigned to each respective bucket. At 710, the TEE 130 decodes (or decompresses) the compressed data stream (e.g., using the token frequency table described above) to recover the data chunks that were stored in the assigned bucket. The TEE 130 calculates the fingerprint value for each data chunk (e.g., using the fingerprint function) and compares the each calculated fingerprint value with the correct fingerprint value determined previously for the corresponding data chunk. The TEE 130 stores (e.g., cached in a buffer) only the data chunk whose calculated fingerprint value matches the correct fingerprint value.

After each TEE 130 has performed the decoding and storing of the corresponding data chunk, the data chunks corresponding to the requested DO are all stored (e.g., cached in buffers) among the TEEs 130. At 712, each TEE encrypts its correct data chunk (e.g., encrypt using the ReqPU provided by the ED 150 during the handshake procedure). At 714, the encrypted data chunks are sent by each TEE 130 out of the respective TEE 130 to the server 110 (i.e., sent out of the protected environment of the respective TEE 130 into the general environment of the server 110).

The server 110 collects the responses from all the TEEs 130 that have been assigned to the buckets. At 716, the server 110 transmits the encrypted data chunks to the ED 150. The encrypted data chunks may include information identifying which data chunk originated from which bucket (e.g., by tagging the encrypted data chunks with a respective bucket number). Such information may be used by the ED 150 to reorder the data chunks at 720 below. Alternatively, instead of explicitly providing such information, the transmission by the server 110 may implicitly indicate which encrypted data chunk originated from which bucket, for example by ordering the encrypted data chunks in the transmission according to numerical order of the buckets.

The ED 150, after receiving the encrypted data chunks, decrypts (at 718) the data chunks (e.g., decrypts using the private key associated with the request (ReqPR)) and recovers (at 720) the DO by using the permutation token that is part of the DO ID to reorder the corresponding data chunks. As discussed above, the DO ID includes a set of permutation token bits at a particular location (e.g., at the beginning) of the DO ID. The ED 150 has knowledge of how the DO ID is configured, to enable the ED 150 to parse the DO ID to extract the permutation token. Although 718 and 720 are shown in FIG. 7 in a particular order, it should be understood that in some examples 720 may be performed before 718. That is, the ED 150 may first use the permutation token to restore the correct order of the data chunks in the DO and then decrypts the data chunks using ReqPR to recover the DO.

FIG. 7 illustrates operations and interactions among the server 110, TEEs 130 of the server 110 and the ED 150, for ease of understanding. In some aspects, the present disclosure may be embodied in operations performed at any one of these entities (for the purpose of this discussion, the TEEs 130 are thought of as entities separate from the server 110, however the TEEs 130 may be physically part of the server 110). Flowcharts illustrating operations at the server 110, a given TEE 130 of the server 110, and the ED 150 are now discussed.

Figure 8:
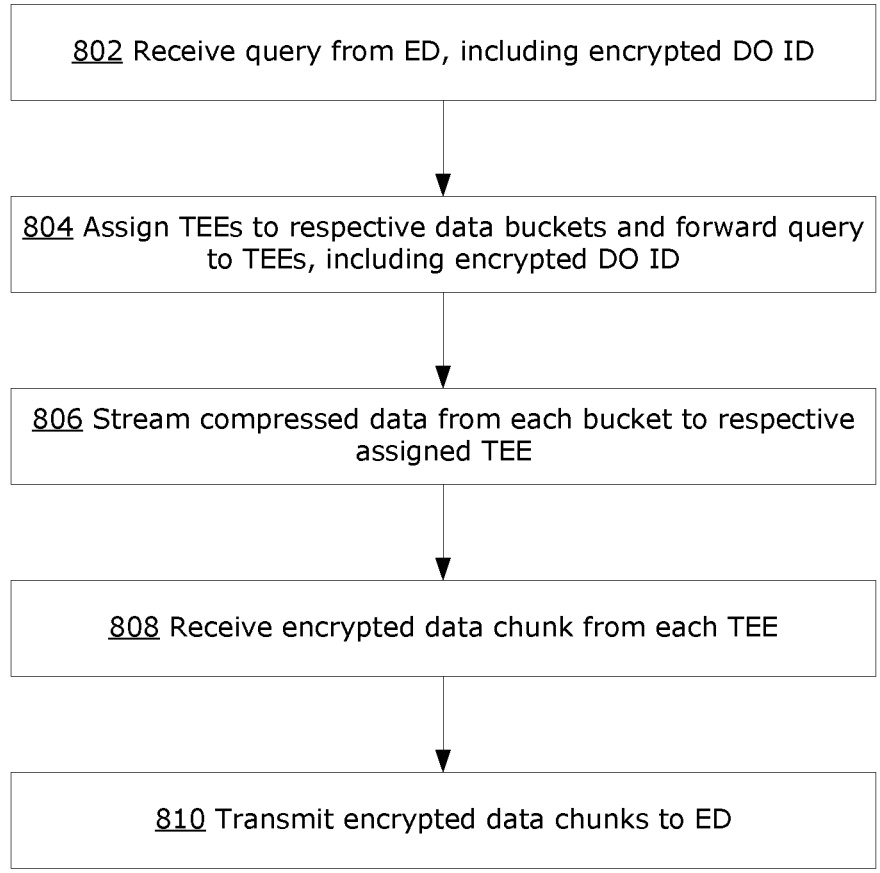
FIG. 8 is a flowchart illustrating an example method performed by a server, in the context of the operations of FIG. 7.

FIG. 8 is a flowchart illustrating an example method 800 that may be performed by the server 110, as part of the operations shown in FIG. 7. In particular, the method 800 may be performed by an operator server program executed by the server 110, and outside of the TEEs 130. Details of some steps may already be described with reference to FIG. 7 and will not be repeated.

In the flowchart shown, it is assumed that the server 110 has already received and stored the compressed data published by the publisher 108, and has received the dataset ID from the ED 150 (e.g., during a handshake process). In some examples, a step of receiving the compressed data from the publisher 108 and/or a step of receiving the dataset ID from the ED 150 may be considered part of the method 800.

At 802, the server 110 receives a query from the ED 150 (e.g., similar to 702 of FIG. 7). The query includes the encrypted DO ID (e.g., encrypted with the TEE PU). Notably, the DO ID is encoded with information (e.g., fingerprint values as discussed above) identifying corresponding data chunks of the DO stored in each bucket, and the DO ID is further encoded with information (e.g., permutation token as discussed above) for ordering the corresponding data chunks in order to recover the DO.

At 804, the server 110 assigns a TEE 130 to each data bucket containing the compressed dataset. The server 110 forwards the query with the still-encrypted DO ID to the TEEs 130 (e.g., similar to 704 of FIG. 7).

At 806, the server 110 streams compressed data from each bucket to the respective assigned TEE 130 (e.g., similar to 708 of FIG. 7). It should be noted that the streaming of compressed data from each bucket may be performed using parallel data streams.

At 808, the server 110 receives, from each TEE 130, encrypted data chunks (e.g., similar to 714 of FIG. 7). The encrypted data chunks may be received from all the TEEs 130 in parallel. The encrypted data chunks may be received from the TEEs 130 only after all data has been streamed at step 806. This may help to preserve data privacy, by ensuring that the server 110 cannot deduce which portion of the data stream corresponds to the encrypted data chunk. The server 110 collects the encrypted data chunks from all TEEs 130 that were assigned at step 804.

At 810, the server 110 transmits the still-encrypted data chunks to the ED 150 (e.g., similar to 716 of FIG. 7). The transmission may be in the form of a response to the query received at step 802.

It should be noted that, throughout the operations of FIG. 7 and the method 800, the server 110 may not be aware of the format or configuration of the DO ID. In particular, the server 110 may not be aware that the data chunks have been placed into buckets based on similarity and that the DO ID includes a permutation token.

Figure 9:
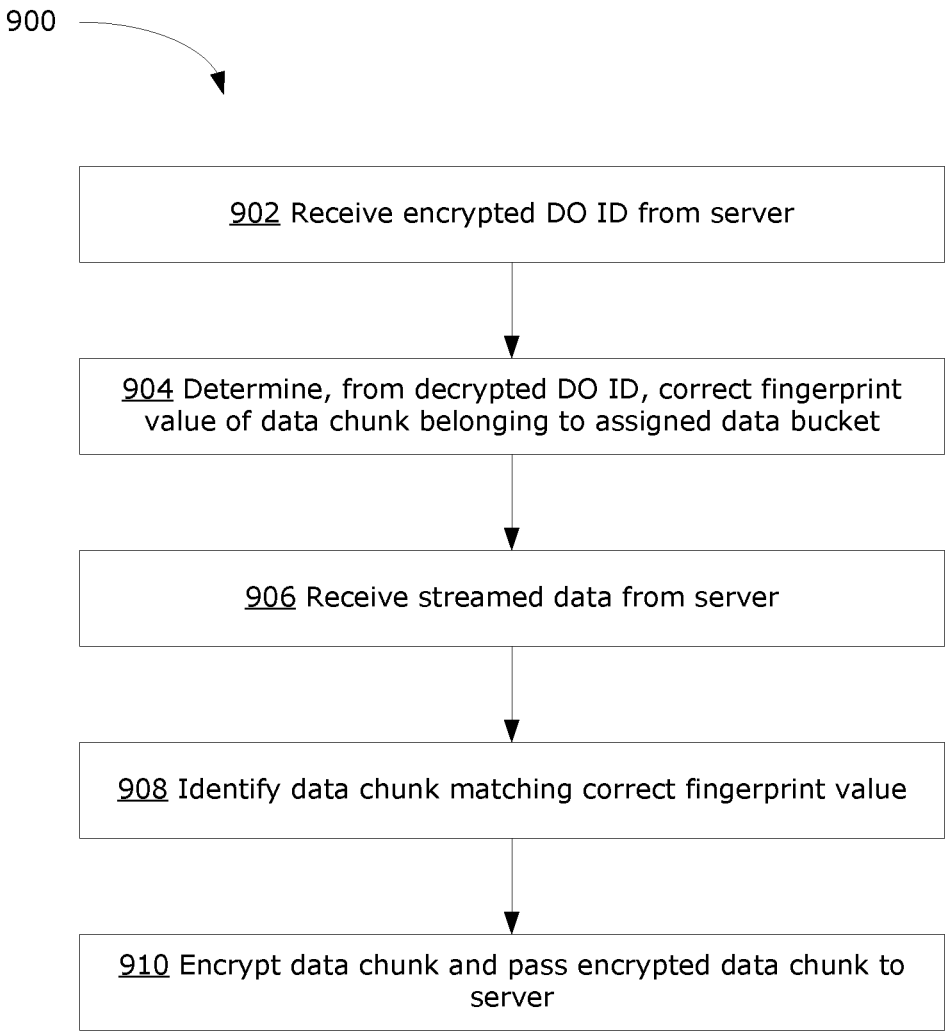
FIG. 9 is a flowchart illustrating an example method performed by a TEE, in the context of the operations of FIG. 7.

FIG. 9 is a flowchart illustrating an example method 900 that may be performed by a given TEE 130 within the server 110, as part of the operations shown in FIG. 7. In particular, the method 900 may be performed by a TEE program executed by the TEE 130, and protected from inspection by the server 110. Details of some steps may already be described with reference to FIG. 7 and will not be repeated.

In the flowchart shown, it is assumed that the TEE 130 has already been assigned a particular bucket and informed of the number (or other identifier) of its assigned bucket. In some examples, a step of receiving an identifier of the assigned bucket may be included in the method 900.

At 902, the TEE 130 receives the encrypted DO ID into the TEE 130 from the server 110 (e.g., similar to 704 of FIG. 7). The TEE 130 decrypts the DO ID (e.g., using its private key). As previously noted, the DO ID is encoded with information (e.g., fingerprint values as discussed above) identifying corresponding data chunks of the DO stored in each bucket, and the DO ID is further encoded with information (e.g., permutation token as discussed above) for ordering the corresponding data chunks in order to recover the DO.

At 904, the TEE 130 determines, from the decrypted DO ID, the correct fingerprint value of the data chunk belonging to its assigned data bucket (e.g., similar to 706 of FIG. 7). For example, the TEE 130 may parse the DO ID according to its known format, in order to determine the set of fingerprint value bits (and hence the fingerprint value) belonging to its assigned bucket. It may be noted that, depending on the format of the DO ID, the TEE 130 may need to use the permutation token encoded in the DO ID to determine which of the fingerprint value bits encoded in the DO ID corresponds to its assigned bucket.

At 906, the TEE 130 receives, from the server 110, a data stream containing the data chunks belonging to its assigned bucket (e.g., similar to 708 of FIG. 7). The data stream may be compressed data, and the TEE 130 may perform decoding (or decompression) on the streamed data.

At 908, the TEE 130 calculates the fingerprint value for each of the data chunks in the data stream and identifies the particular data chunk whose fingerprint value matches the correct fingerprint value determined at step 904 (e.g., similar to 710 of FIG. 7). This data chunk is cached in the buffer of the TEE 130. Other data chunks may be discarded.

At 910, the TEE 130 encrypts the data chunk (e.g., using the public key provided by the ED 150) and sends the encrypted data chunk out of the TEE 130 to the server 110 (e.g., similar to 712 and 714 of FIG. 7).

Figure 10:
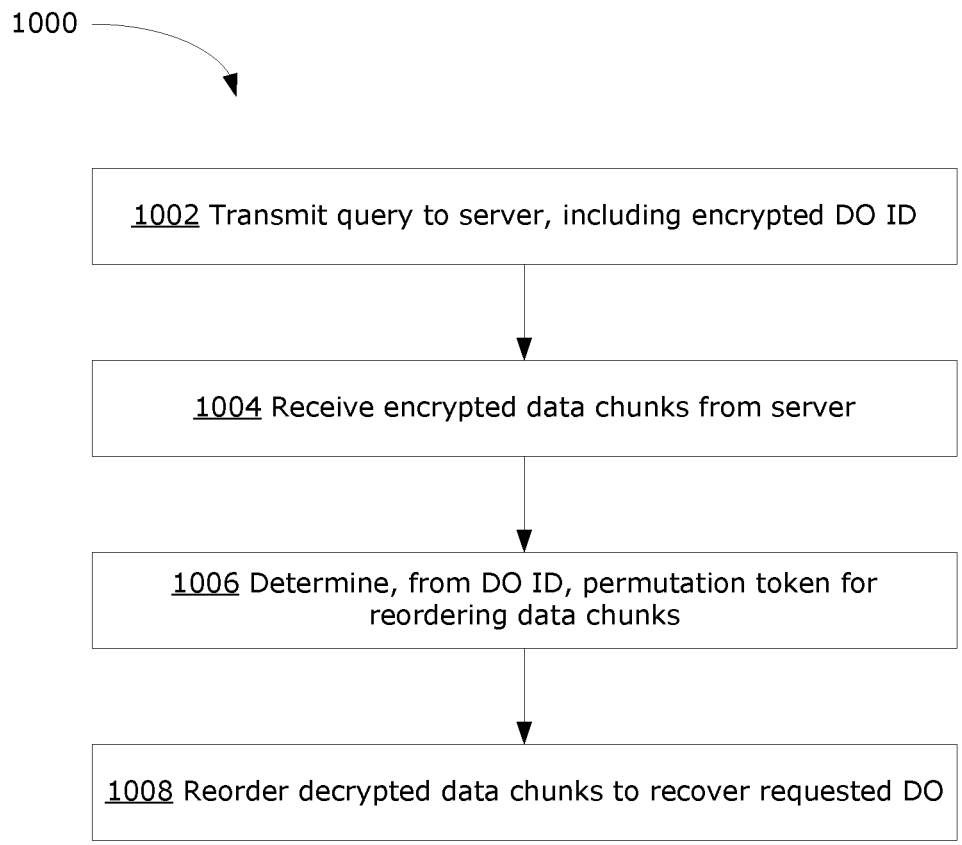
FIG. 10 is a flowchart illustrating an example method performed by a client electronic device, in the context of the operations of FIG. 7.

FIG. 10 is a flowchart illustrating an example method 1000 that may be performed by the ED 150, as part of the operations shown in FIG. 7. In particular, the method 1000 may be performed by a customer client program executed by the ED 150. Details of some steps may already be described with reference to FIG. 7 and will not be repeated.

In the flowchart shown, it is assumed that the ED 150 has already validated the TEE 130 (e.g., using a handshake process) and has already provided the dataset ID to the server 110.

At 1002, the ED 150 transmits a DO query to the server 110 (e.g., similar to 702 of FIG. 7). The query includes the encrypted DO ID (e.g., encrypted with the TEE PU). Notably, the DO ID is encoded with information (e.g., fingerprint values as discussed above) identifying corresponding data chunks of the DO stored in each bucket, and the DO ID is further encoded with information (e.g., permutation token as discussed above) for ordering the corresponding data chunks in order to recover the DO.

At 1004, the ED 150 receives, from the server 110, encrypted data chunks in response to the query (e.g., similar to 716 of FIG. 7). The data chunks may be encrypted using a public key provided by the ED 150. The ED 150 may decrypt the data chunks using its private key (e.g., similar to 718 of FIG. 7).

At 1006, the ED 150 parses the DO ID to determine the permutation token. The permutation token provides information to enable the ED 150 to reorder the data chunks into the correct order for recovering the requested DO.

At 1008, the ED 150 performs reordering of the decrypted data chunks, to recover the requested DO (e.g., similar to 720 of FIG. 7). It should be noted that the ED 150 may, in some examples, perform reordering of the encrypted data chunks and perform decrypting subsequent to reordering.

Although the methods 800 and 900 have been described above with respect to one DO query from one ED 150, in some examples the server 110 and TEEs 130 may serve multiple DO queries from one or more EDs 130 in parallel, using similar steps. Similarly, although the method 1000 has been described above with respect to one DO query from the ED 150, in some examples the ED 150 may query more than one DO from one or more datasets in parallel, using similar steps. Other such variations may be possible. Further, in some examples a TEE 130 may be assigned multiple buckets (e.g., from the same dataset) to process in parallel.

Although the present disclosure makes reference to a TEE, it should be understood that examples may be implemented using other forms of trusted intermediate environments, including any trusted environment within the server, within the ED, or at some other network entity.

The present disclosure describes the use of a single DO ID for querying a single DO, where the DO ID encodes information for identifying corresponding data chunks within data buckets and for reordering the corresponding data chunks to recover the DO. In some examples, the information for identifying corresponding data chunks (e.g., fingerprint values for each data chunk within each respective bucket) and the information for reordering the corresponding data chunks (e.g., permutation token) may be encoded in separate pieces of data. For example, if the permutation token is not needed by the TEE (e.g., the TEE is able to identify the correct fingerprint value for its assigned bucket without having to know the permutation token), the permutation token may not be encoded in the DO ID that is transmitted in the query. The ED may instead keep the permutation token locally for reordering the data chunks.

In various examples described herein, the present disclosure may enable more efficient data stream grouping, which takes into account the statistical properties concerning data compressibility of the data objects. This may enable more efficient and/or more effective data compression.

The present disclosure also describes examples for generating data object identifiers using a fingerprint-based scheme. Data object identifiers generated in accordance with examples of the present disclosure may provide information to enable recovery of the data object, regardless of how data chunks are merged and/or reordered among data buckets. Because the data object identifier encodes information for identifying corresponding data chunks among data buckets and for reordering data chunks, this enables the possibility of reshaping the data stream to achieve higher compression ratios.

Although the present disclosure describes examples in the context of a content-delivery network (CDN), it should be understood that the present disclosure may have applications in other fields. Examples described herein may be useful for implementing different open network architectures (e.g., for designing network protocols), among other possibilities. For example, the present disclosure may be useful in preserving data privacy in cases where a content ID may be exposed during transmission of network packets.

Further, although the present disclosure describes examples in the context of static data, examples described herein may be generalized to server-side dynamic request evaluation with protections from the server operator.

Although the present disclosure describes methods and processes with steps in a certain order, one or more steps of the methods and processes may be omitted or altered as appropriate. One or more steps may take place in an order other than that in which they are described, as appropriate.

Although the present disclosure is described, at least in part, in terms of methods, a person of ordinary skill in the art will understand that the present disclosure is also directed to the various components for performing at least some of the aspects and features of the described methods, be it by way of hardware components, software or any combination of the two. Accordingly, the technical solution of the present disclosure may be embodied in the form of a software product. A suitable software product may be stored in a pre-recorded storage device or other similar non-volatile or non-transitory computer readable medium, including DVDs, CD-ROMs, USB flash disk, a removable hard disk, or other storage media, for example. The software product includes instructions tangibly stored thereon that enable a processing device (e.g., a personal computer, a server, or a network device) to execute examples of the methods disclosed herein.

The present disclosure may be embodied in other specific forms without departing from the subject matter of the claims. The described example embodiments are to be considered in all respects as being only illustrative and not restrictive. Selected features from one or more of the above-described embodiments may be combined to create alternative embodiments not explicitly described, features suitable for such combinations being understood within the scope of this disclosure.

All values and sub-ranges within disclosed ranges are also disclosed. Also, although the systems, devices and processes disclosed and shown herein may comprise a specific number of elements/components, the systems, devices and assemblies could be modified to include additional or fewer of such elements/components. For example, although any of the elements/components disclosed may be referenced as being singular, the embodiments disclosed herein could be modified to include a plurality of such elements/components. The subject matter described herein intends to cover and embrace all suitable changes in technology.

The invention claimed is:

1. A method, in a trusted environment within a server, comprising:
   receiving, into the trusted environment within the server, a data object identifier identifying a requested data object, the requested data object being stored as a plurality of corresponding data chunks in a respective plurality of data buckets, the data object identifier being encoded with information identifying each of the plurality of corresponding data chunks within the respective data bucket;
   wherein the information identifying each of the plurality of corresponding data chunks is a plurality of fingerprint values, each fingerprint value uniquely identifying a respective corresponding data chunk within a respective data bucket;
   wherein the trusted environment is a trusted execution environment (TEE) hardware of the server; and
   wherein an assigned data bucket has been assigned to the trusted environment, and wherein a data stream corresponding to the assigned data bucket is received into the trusted environment, the data stream including all data chunks stored in the assigned data bucket;
   determining, using the information identifying each of the plurality of corresponding data chunks, which of the data chunks in the data stream is the corresponding data chunk received from the assigned data bucket;
   wherein determining the corresponding data chunk comprises:
      determining a correct fingerprint value from the data object identifier, the correct fingerprint value identifying the corresponding data chunk for the assigned data bucket;
      determining the fingerprint value for each of the data chunks in the data stream; and
      comparing the fingerprint value for each of the data chunks in the data stream with the correct fingerprint value, to determine the corresponding data chunk; and
   sending the corresponding data chunk out of the trusted environment to the server.

2. The method of claim 1, further comprising:
   receiving the data stream from the server into the trusted environment.

3. The method of claim 1, wherein the data object identifier is further encoded with information for ordering the corresponding data chunks to recover the requested data object.

4. The method of claim 3, wherein determining which of the data chunks is the corresponding data chunk comprises using the information for ordering the corresponding data chunks to determine the information identifying the corresponding data chunk for the assigned data bucket.

5. The method of claim 3, wherein the information for ordering the corresponding data chunks is a permutation token.

6. The method of claim 1, further comprising:
receiving, into the trusted environment, the data object identifier as an encrypted data object identifier;
decrypting the data object identifier using a private key of the trusted environment; and
sending the corresponding data chunk out of the trusted environment to the server as an encrypted corresponding data chunk.

7. The method of claim 1, further comprising:
performing the steps of receiving the data object identifier, determining the corresponding data chunk, and sending the corresponding data chunk, at least partly in parallel for a first and a second received data object identifier.

8. The method of claim 1, wherein the data stream comprises compressed data, the method further comprising decompressing the compressed data.

9. A method, in a publisher server, comprising:
for each given data object of a plurality of data objects:
dividing the given data object into a plurality of corresponding data chunks; and
assigning each of the plurality of corresponding data chunks to a respective one of a plurality of data buckets based on similarity of each corresponding data chunks to any other data chunk assigned to the respective data bucket;
wherein all data chunks for all data objects are assigned to one of the plurality of data buckets;
for each given data object, generating a data object identifier at the publisher server for recovering the given data object from the plurality of data buckets, the data object identifier being encoded with information identifying each of the plurality of corresponding data chunks within a respective data bucket, wherein generating the data object identifier comprises:
for each given data bucket, determining a fingerprint value for each data chunk assigned to the given data bucket, the fingerprint value uniquely identifying each respective data chunk within the given data bucket; and
for each given data object, encoding in the data object identifier the fingerprint value for each respective corresponding data chunk;
for each given data object, the data object identifier further being encoded with information for ordering the corresponding data chunks to recover the requested data object;
wherein generating the data object identifier further comprises:
for each given data object:
determining a bucket order by which each corresponding data chunk has been assigned to a respective data bucket;
generating a permutation token representing the bucket order; and
encoding in the data object identifier the permutation token,
compressing each data bucket into a respective set of compressed data at the publisher server; and
publishing the sets of compressed data and the generated data object identifiers.

10. The method of claim 9, wherein the data chunks assigned to each respective data bucket are ordered according to similarity within each respective data bucket.

11. The method of claim 9, wherein each data bucket has assigned thereto a single corresponding data chunk from each data object.

12. The method of claim 9, wherein each data bucket is compressed using an adaptive statistical encoding compressing.

13. A method, at an electronic device, comprising:
transmitting, at the electronic device, a query for a data object, the query including a data object identifier, wherein the data object identifier is encoded with information including:
information identifying each of a plurality of data chunks within a respective data bucket, the information identifying each of the plurality of data chunks including a plurality of fingerprint values, each fingerprint value uniquely identifying a respective corresponding data chunk within a respective data bucket; and
information for ordering the data chunks; the information for ordering the data chunks including a permutation token;
receiving, at the electronic device, the plurality of data chunks in response to the query for the data object, wherein the plurality of data chunks each have fingerprint values that match the fingerprint values for each of the plurality of data chunks encoded in the query for the data object;
determining, at the electronic device, from the data object identifier associated with the data object, information for ordering the data chunks to recover the data object; and
reordering, at the electronic device, the data chunks to recover the data object.

14. The method of claim 13, further comprising:
receiving the plurality of data chunks as a plurality of encrypted data chunks; and
decrypting the plurality of encrypted data chunks using a private key.

* * * * *